United States Patent
Hersam et al.

(10) Patent No.: US 12,406,996 B2
(45) Date of Patent: *Sep. 2, 2025

(54) COMPOSITE MATERIAL WITH CONFORMAL GRAPHENE COATING, FABRICATING METHODS AND APPLICATIONS OF SAME

(71) Applicant: NORTHWESTERN UNIVERSITY, Evanston, IL (US)

(72) Inventors: Mark C. Hersam, Wilmette, IL (US); Norman S. Luu, Chicago, IL (US); Jin-Myoung Lim, Coppell, TX (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 462 days.

This patent is subject to a terminal disclaimer.

(21) Appl. No.: 17/713,373

(22) Filed: Apr. 5, 2022

(65) Prior Publication Data
US 2022/0344665 A1    Oct. 27, 2022

Related U.S. Application Data

(60) Provisional application No. 63/180,301, filed on Apr. 27, 2021.

(51) Int. Cl.
*H01M 4/62*     (2006.01)
*H01M 4/36*     (2006.01)
(Continued)

(52) U.S. Cl.
CPC ........... *H01M 4/625* (2013.01); *H01M 4/364* (2013.01); *H01M 4/525* (2013.01); *H01M 4/583* (2013.01);
(Continued)

(58) Field of Classification Search
CPC ........... H01M 10/0525; H01M 10/054; H01M 2004/021; H01M 2004/028;
(Continued)

(56) References Cited

U.S. PATENT DOCUMENTS 8,691,335 B2   4/2014   Miller
8,691,441 B2   4/2014   Zhamu et al.
(Continued)

FOREIGN PATENT DOCUMENTS

EP    1702375 B1    4/2013
WO    2015184155 A1   12/2015

OTHER PUBLICATIONS

Supporting Information, Comprehensive Enhancement of Nanostructured Lithium Ion battery cathode materials via conformal graphene dispersion (Year: 2017).*
(Continued)

*Primary Examiner* — Victoria H Lynch
(74) *Attorney, Agent, or Firm* — troutman pepper locke; Tim Tingkang Xia, Esq.

(57) ABSTRACT

A composite material and a method for fabricating the same. The composite material includes graphene and active material particles. Each surface of the active material particles is conformally coated with said graphene. The method includes forming a mixture containing an active material, graphene, ethyl cellulose (EC) polymer and multiwalled carbon nanotubes, and thermally annealing the mixture at an annealing temperature in an oxidizing environment to decompose the majority of EC, thereby resulting in the composite material having each active material particle coated with a conformal graphene coating.

35 Claims, 19 Drawing Sheets

(51) Int. Cl.
*H01M 4/525* (2010.01)
*H01M 4/583* (2010.01)
*H01M 4/02* (2006.01)
*H01M 10/0525* (2010.01)
*H01M 10/054* (2010.01)

(52) U.S. Cl.
CPC ...... *H01M 4/622* (2013.01); *H01M 2004/028* (2013.01); *H01M 10/0525* (2013.01); *H01M 10/054* (2013.01)

(58) Field of Classification Search
CPC .. H01M 4/0471; H01M 4/131; H01M 4/1391; H01M 4/364; H01M 4/366; H01M 4/505; H01M 4/525; H01M 4/5825; H01M 4/583; H01M 4/622; H01M 4/625; Y02E 60/10
See application file for complete search history.

(56) References Cited

U.S. PATENT DOCUMENTS

| | | | |
|---|---|---|---|
| 2010/0143798 | A1 | 6/2010 | Zhamu et al. |
| 2014/0332731 | A1* | 11/2014 | Ma .......................... C09D 7/70 252/506 |
| 2017/0338472 | A1* | 11/2017 | Zhamu ................. H01M 4/366 |
| 2018/0254517 | A1* | 9/2018 | Hersam ............... H01M 4/0416 |

OTHER PUBLICATIONS

A. Yano, M. Shikano, A. Ueda, H. Sakaebe, Z. Ogumi, J. Electrochem. Soc. 2016, 164, A6116.
W. M. Seong, K. Yoon, M. H. Lee, S. K. Jung, K. Kang, Nano Lett. 2019, 19, 29.
H. Li, N. Zhang, J. Li, J. R. Dahn, J. Electrochem. Soc. 2018, 165, A2985.
W. Li, J. N. Reimers, J. R. Dahn, Solid State Ionics 1993, 67, 123.
L. Croguennec, C. Pouillerie, A. N. Mansour, C. Delmas, J. Mater. Chem. 2001, 11, 131.
J. Choi, A. Manthiram, J. Electrochem. Soc. 2005, 152, A1714.
W. E. Gent, Y. Li, S. Ahn, J. Lim, Y. Liu, A. M. Wise, C. B. Gopal, D. N. Mueller, R. Davis, J. N. Weker, J.-H. Park, S.-K. Doo, W. C. Chueh, Adv. Mater. 2016, 28, 6631.
S. Li, Z. Jiang, J. Han, Z. Xu, C. Wang, H. Huang, C. Yu, S.-J. Lee, P. Pianetta, H. Ohldag, J. Qiu, J.-S. Lee, F. Lin, K. Zhao, Y. Liu, Nat. Commun. 2020, 11, 4433.
Z. Jiang, J. Li, Y. Yang, L. Mu, C. Wei, X. Yu, P. Pianetta, K. Zhao, P. Cloetens, F. Lin, Y. Liu, Nat. Commun. 2020, 11, 2310.
A. Mukhopadhyay, B. W. Sheldon, Prog. Mater. Sci. 2014, 63, 58.
K. Min, E. Cho, Phys. Chem. Chem. Phys. 2018, 20, 9045.
Y. Li, K. Yan, H.-W. Lee, Z. Lu, N. Liu, Y. Cui, Nat. Energy 2016, 1, 15029.
T. H. Wan, M. Saccoccio, C. Chen, F. Ciucci, Electrochim. Acta 2015, 184, 483.
B. H. Toby, R. B. Von Dreele, J. Appl. Crystallogr. 2013, 46, 544.
Y. Mo, B. Hou, D. Li, X. Jia, B. Cao, L. Yin, Y. Chen, RSC Adv. 2016, 6, 88713.
Y. Huang, F.-M. Jin, F.-J. Chen, L. Chen, J. Power Sources 2014, 256, 1.
Y. Shi, M. Zhang, D. Qian, Y. S. Meng, Electrochim. Acta 2016, 203, 154.
L. Li, Z. Chen, Q. Zhang, M. Xu, X. Zhou, H. Zhu, K. Zhang, J. Mater. Chem. A 2015, 3, 894.
L. Liang, X. Sun, C. Wu, L. Hou, J. Sun, X. Zhang, C. Yuan, ACS Appl. Mater. Interfaces 2018, 10, 5498.
D. Wang, X. Li, Z. Wang, H. Guo, Y. Xu, Y. Fan, Electrochim. Acta 2016, 196, 101.
Z. Wu, S. Ji, T. Liu, Y. Duan, S. Xiao, Y. Lin, K. Xu, F. Pan, Nano Lett. 2016, 16, 6357.
X. Jia, M. Yan, Z. Zhou, X. Chen, C. Yao, D. Li, D. Chen, Y. Chen, Electrochim. Acta 2017, 254, 50.
T. Doi, R. Matsumoto, Z. Cao, M. Haruta, M. Hashinokuchi, M. Inaba, Sustain. Energy Fuels 2018, 2, 1197.
Z. Wu, X. Han, J. Zheng, Y. Wei, R. Qiao, F. Shen, J. Dai, L. Hu, K. Xu, Y. Lin, W. Yang, F. Pan, Nano Lett. 2014, 14, 4700.
R. Wang, X. Dai, Z. Qian, Y. Sun, S. Fan, K. Xiong, H. Zhang, F. Wu, ACS Mater. Lett. 2020, 2, 280.
R. Mo, et al., Facile synthesis of nanocrystalline LiFePO4/graphene composite as cathode material for high power lithium ion batteries. (2014) Electrochimica Acta vol. 130, 594-599.
N. Li, et al., The preparation and graphene surface coating NaTi2(PO4)3 as cathode material for lithium ion batteries. (2017) Applied Surface Science vol. 399, 624-629.
K. S. Chen, et al., Comprehensive Enhancement of Nanostructured Lithium-Ion Battery Cathode Materials via Conformal Graphene Dispersion. (2017) Nano Letters, 17, 4, 2539-2546.
W. Xue, et al., Ultra-high-voltage Ni-rich layered cathodes in practical Li metal batteries enabled by a sulfonamide-based electrolyte. Nature Energy (2021).
R. Wang, et al., In Situ Surface Protection for Enhancing Stability and Performance of LiNi0.5Mn0.3Co0.2O2 at 4.8 V: The Working Mechanisms. ACS Materials Lett. (2020), 2, 4, 280-290.
W. Zhao, et al., High Voltage Operation of Ni-Rich NMC Cathodes Enabled by Stable Electrode/Electrolyte Interphases. Adv. Energy Mater. (2018), 8, 1800297.
D. Mohanty, et al., Modification of Ni-Rich FCG NMC and NCA Cathodes by Atomic Layer Deposition: Preventing Surface Phase Transitions for High-Voltage Lithium-Ion Batteries. Scientific Reports 6, 26532 (2016).
H. Gao, et al., Modifying the Surface of a High-Voltage Lithium-Ion Cathode. ACS Appl. Energy Mater. 2018, 1, 5, 2254-2260.
J.-M. Lim, et al., Enhancing nanostructured nickel-rich lithium-ion battery cathodes via surface stabilization. Journal of Vacuum Science & Technology A 38, 063210 (2020).
Y. Mo, et al., Enhanced high-rate capability and high voltage cycleability of Li2TiO3-coated LiNi0.5Co0.2Mn0.3O2 cathode materials. RSC Adv., 2016, 6, 88713-88718.
Y. Huang, et al., Improved cycle stability and high-rate capability of Li3VO4-coated Li[Ni0.5Co0.2Mn0.3]O2 cathode material under different voltages. Journal of Power Sources 256 (2014) 1-7.
[93] L. Li, et al., A hydrolysis-hydrothermal route for the synthesis of ultrathin LiAlO2-inlaid LiNi0.5Co0.2Mn0.3O2 as a high-performance cathode material for lithium ion batteries. Journal of Materials Chemistry A (2015), 3 (2), 894-904.
L. Liang, et al., Nasicon-Type Surface Functional Modification in Core-Shell LiNi0.5Mn0.3Co0.2O2@NaTi2(PO4)3 Cathode Enhances Its High-Voltage Cycling Stability and Rate Capacity toward Li-Ion Batteries. ACS Appl. Mater. Interfaces 2018, 10, 5498-5510.
D. Wang, et al., Co-modification of LiNi0.5Co0.2Mn0.3O2 cathode materials with zirconium substitution and surface polypyrrole coating: towards superior high voltage. Electrochimica Acta (2016), 196, 101-109.
X. Jia, et al., Nd-doped LiNi0.5Co0.2Mn0.3O2 as a cathode material for better rate capability in high voltage cycling of Li-ion batteries. Electrochimica Acta 254 (2017) 50-58.
Z. Wu, et al., Depolarized and Fully Active Cathode Based on Li(Ni0.5Co0.2Mn0.3)O2 Embedded in Carbon Nanotube Network for Advanced Batteries. Nano Lett. 2014, 14, 4700-4706.
W. Li, E. M. Erickson, A. Manthiram, Nat. Energy 2020, 5, 26.
L. Giordano, P. Karayaylali, Y. Yu, Y. Katayama, F. Maglia, S. Lux, Y. Shao-Horn, J. Phys. Chem. Lett. 2017, 8, 3881.
Y. Yu, P. Karayaylali, Y. Katayama, L. Giordano, M. Gauthier, F. Maglia, R. Jung, I. Lund, Y. Shao-Horn, J. Phys. Chem. C 2018, 122, 27368.
G. Cherkashinin, M. Motzko, N. Schulz, T. Spath, W. Jaegermann, Chem. Mater. 2015, 27, 2875.
S. K. Jung, H. Gwon, J. Hong, K. Y. Park, D. H. Seo, H. Kim, J. Hyun, W. Yang, K. Kang, Adv. Energy Mater. 2014, 4, 1300787.
K. W. Nam, S. M. Bak, E. Hu, X. Yu, Y. Zhou, X. Wang, L. Wu, Y. Zhu, K. Y. Chung, X. Q. Yang, Adv. Funct. Mater. 2013, 23, 1047.
F. Lin, I. M. Markus, D. Nordlund, T.-C. Weng, M. D. Asta, H. L. Xin, M. M. Doeff, Nat. Commun. 2014, 5, 3529.

(56) References Cited

OTHER PUBLICATIONS

D. P. Abraham, R. D. Twesten, M. Balasubramanian, I. Petrov, J. McBreen, K. Amine, Electrochem. Commun. 2002, 4, 620.

F. Lin, D. Nordlund, I. M. Markus, T. C. Weng, H. L. Xin, M. M. Doeff, Energy Environ. Sci. 2014, 7, 3077.

K. Kang, G. Ceder, Phys. Rev. B 2006, 74, 094105.

W. Liu, P. Oh, X. Liu, M. J. Lee, W. Cho, S. Chae, Y. Kim, J. Cho, Angew. Chemie—Int. Ed. 2015, 54, 4440.

W. Li, H. Y. Asl, Q. Xie, A. Manthiram, J. Am. Chem. Soc. 2019, 141, 5097.

A. O. Kondrakov, A. Schmidt, J. Xu, H. Geßwein, R. Mönig, P. Hartmann, H. Sommer, T. Brezesinski, J. J. Janek, J. Phys. Chem. C 2017, 121, 3286.

F. Zhang, S. Lou, S. Li, Z. Yu, Q. Liu, A. Dai, C. Cao, M. F. Toney, M. Ge, X. Xiao, W.-K. Lee, Y. Yao, J. Deng, T. Liu, Y. Tang, G. Yin, J. Lu, D. Su, J. Wang, Nat. Commun. 2020, 11, 3050.

C. Tian, Y. Xu, C. Tian, Y. Xu, D. Nordlund, F. Lin, J. Liu, Z. Sun, Y. Liu, Joule 2018, 2, 464.

Y. Mao, X. Wang, S. Xia, K. Zhang, C. Wei, S. Bak, Z. Shadike, X. Liu, Y. Yang, R. Xu, P. Pianetta, S. Ermon, E. Stavitski, K. Zhao, Z. Xu, F. Lin, X. Yang, E. Hu, Adv. Funct. Mater. 2019, 29, 1900247.

Y. Yang, R. Xu, K. Zhang, S. Lee, L. Mu, P. Liu, C. K. Waters, S. Spence, Z. Xu, C. Wei, D. J. Kautz, Q. Yuan, Y. Dong, Y.-S. Yu, X. Xiao, H.-K. Lee, P. Pianetta, P. Cloetens, J.-S. Lee, K. Zhao, F. Lin, Y. Liu, Adv. Energy Mater. 2019, 9, 1900674.

D. J. Miller, C. Proff, J. G. Wen, D. P. Abraham, J. Bareño, Adv. Energy Mater. 2013, 3, 1098.

H. Liu, M. Wolf, K. Karki, Y. Yu, E. A. Stach, J. Cabana, K. W. Chapman, P. J. Chupas, Nano Lett. 2017, 17, 3452.

Y. Su, S. Cui, Z. Zhuo, W. Yang, X. Wang, F. Pan, ACS Appl. Mater. Interfaces 2015, 7, 25105.

D. Mohanty, K. Dahlberg, D. M. King, L. A. David, A. S. Sefat, D. L. Wood, C. Daniel, S. Dhar, V. Mahajan, M. Lee, F. Albano, Sci. Rep. 2016, 6, 26532.

M. R. Laskar, D. H. K. Jackson, S. Xu, R. J. Hamers, D. Morgan, T. F. Kuech, ACS Appl. Mater. Interfaces 2017, 9, 11231.

J. Ahn, E. K. Jang, S. Yoon, S. J. Lee, S. J. Sung, D. H. Kim, K. Y. Cho, Appl. Surf. Sci. 2019, 484, 701.

H. Gao, J. Cai, G. L. Xu, L. Li, Y. Ren, X. Meng, K. Amine, Z. Chen, Chem. Mater. 2019, 31, 2723.

W. Hu, C. Zhang, H. Jiang, M. Zheng, Q. H. Wu, Q. Dong, Electrochim. Acta 2017, 243, 105.

J. Wang, Y. Yu, B. Li, T. Fu, D. Xie, J. Cai, J. Zhao, Phys. Chem. Chem. Phys. 2015, 17, 32033.

Z. Chen, Y. Qin, K. Amine, Y. Sun, J. Mater. Chem. 2010, 7606.

J. Duan, X. Tang, H. Dai, Y. Yang, W. Wu, X. Wei, Y. Huang, Electrochem. Energy Rev. 2020, 3, 1.

K. S. Chen, R. Xu, N. S. Luu, E. B. Secor, K. Hamamoto, Q. Li, S. Kim, V. K. Sangwan, I. Balla, L. M. Guiney, J. W. T. Seo, X. Yu, W. Liu, J. Wu, C. Wolverton, V. P. Dravid, S. A. Barnett, J. Lu, K. Amine, M. C. Hersam, Nano Lett. 2017, 17, 2539.

J.-M. Lim, N. S. Luu, K.-Y. Park, M. T. Z. Tan, S. Kim, J. R. Downing, K. He, V. P. Dravid, M. C. Hersam, J. Vac. Sci. Technol. A 2020, 38, 063210.

E. B. Secor, P. L. Prabhumirashi, K. Puntambekar, M. L. Geier, M. C. Hersam, J. Phys. Chem. Lett. 2013, 4, 1347.

A. C. M. De Moraes, J. Obrzut, V. K. Sangwan, J. R. Downing, L. E. Chaney, D. K. Patel, R. E. Elmquist, M. C. Hersam, J. Mater. Chem. C 2020, 8, 15086.

P. Shafiei Sabet, D. U. Sauer, J. Power Sources 2019, 425, 121.

K.-Y. Y. Park, J.-M. M. Lim, N. S. Luu, J. R. Downing, S. G. Wallace, L. E. Chaney, H. Yoo, W. J. Hyun, H.-U. U. Kim, M. C. Hersam, Adv. Energy Mater. 2020, 10, 2001216.

J. Sánchez-González, A. Macías-García, M. F. Alexandre-Franco, V. Gómez-Serrano, Carbon N. Y. 2005, 43, 741.

S.-C. Yin, Y.-H. Rho, I. Swainson, L. F. Nazar, Chem. Mater. 2006, 18, 1901.

J.-M. Lim, T. Hwang, D. Kim, M. Park, K. Cho, Sci. Rep. 2017, 7, 2.

B. Strzemiecka, A. Voelkel, J. Donate-Robles, J. M. Martín-Martínez, Appl. Surf. Sci. 2014, 316, 315.

E. B. Secor, S. Lim, H. Zhang, C. D. Frisbie, L. F. Francis, M. C. Hersam, Adv. Mater. 2014, 26, 4533.

E. B. Secor, T. Z. Gao, A. E. Islam, R. Rao, S. G. Wallace, J. Zhu, K. W. Putz, B. Maruyama, M. C. Hersam, Chem. Mater. 2017, 29, 2332.

W. Li, A. Dolocan, P. Oh, H. Celio, S. Park, J. Cho, A. Manthiram, Nat. Commun. 2017, 8, 14589.

X. Yang, J. Chen, Q. Zheng, W. Tu, L. Xing, Y. Liao, M. Xu, Q. Huang, G. Cao, W. Li, J. Mater. Chem. A 2018, 6, 16149.

C. Xu, K. Märker, J. Lee, A. Mahadevegowda, P. J. Reeves, S. J. Day, M. F. Groh, S. P. Emge, C. Ducati, B. Layla Mehdi, C. C. Tang, C. P. Grey, Nat. Mater. 2021, 20, 84.

F. Lin, D. Nordlund, T. Pan, I. M. Markus, T. C. Weng, H. L. Xin, M. M. Doeff, J. Mater. Chem. A 2014, 2, 19833.

T. Hayashi, J. Okada, E. Toda, R. Kuzuo, N. Oshimura, N. Kuwata, J. Kawamura, J. Electrochem. Soc. 2014, 161, A1007.

F. Lin, D. Nordlund, Y. Li, M. K. Quan, L. Cheng, T.-C. C. Weng, Y. Liu, H. L. Xin, M. M. Doeff, Nat. Energy 2016, 1, 15004.

M. D. Radin, J. Alvarado, Y. S. Meng, A. Van Der Ven, Nano Lett. 2017, 17, 7789.

Y. Jiang, C. Qin, P. Yan, M. Sui, J. Mater. Chem. A 2019, 7, 20824.

Z. Chen, J. R. Dahn, Electrochim. Acta 2004, 49, 1079.

\* cited by examiner

COMPOSITE MATERIAL WITH CONFORMAL GRAPHENE COATING, FABRICATING METHODS AND APPLICATIONS OF SAME

CROSS-REFERENCE TO RELATED PATENT APPLICATION

This application claims priority to and the benefit of U.S. Provisional Application No. 63/180,301, filed Apr. 27, 2021, which is incorporated herein in its entirety by reference.

STATEMENT AS TO RIGHTS UNDER FEDERALLY-SPONSORED RESEARCH

This invention was made with government support under DE-AC02-06CH11357 awarded by the Department of Energy, and 2039268, 2037026, 1720139, and 1727846 awarded by the National Science Foundation. The government has certain rights in the invention.

FIELD OF THE INVENTION

The present invention relates generally to the material science, and more particularly to composite materials with conformal graphene coating, fabricating methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Lithium-ion batteries (LIBs) have emerged as the preeminent power sources for renewable energy technologies due to their portability, manufacturability, and high energy density. Layered lithium nickel manganese cobalt oxides (LiNi$_x$Mn$_y$Co$_z$O$_2$, or NMCs) are ideal materials for LIB cathodes due to their high practical capacities and lithiation reversibility. In particular, nickel-rich stoichiometries of NMC, such as NMC532 (LiNi$_{0.5}$Mn$_{0.3}$Co$_{0.2}$O$_2$), NMC622 (LiNi$_{0.6}$Mn$_{0.2}$Co$_{0.2}$O$_2$), and NMC811 (LiNi$_{0.8}$Mn$_{0.1}$Co$_{0.1}$O$_2$), as well as related chemistries like NCA (LiNi$_{0.8}$Co$_{0.15}$Al$_{0.05}$O$_2$), have become the cathode materials of choice for many high-performance applications, including modern electric vehicles. Despite these desirable properties, nickel-rich cathode materials suffer from severe cyclic stability issues related to chemical, structural, and mechanical deterioration. For these reasons, the practical operating window for layered cathodes has been empirically limited to an upper cutoff voltage of 4.3 V vs. Li/Li$^+$. However, since additional capacity and energy density can be obtained by operating LIBs over wider electrochemical voltage windows, the ability to safely and reliably utilize nickel-rich cathode materials at higher states of charge (SOCs) is greatly desired.

Cathode material degradation is severely exacerbated at high operating potentials (>4.7 V vs. Li/Li$^+$). For example, electrolyte degradation reactions, such as ethylene carbonate dehydrogenation or PF$_6^-$ decomposition, become increasingly favorable at higher voltages due to the increased reactivity of lattice oxygen. The resulting organic and lithium fluorophosphate reaction products form a solid-electrolyte interphase (SEI), which irreversibly consumes the lithium inventory and impedes subsequent ionic transport. These compounds are known to react with other electrolyte salt components to form HF, which etches the active material and further accelerates capacity fade. Moreover, SOC-dependent structural changes have also been observed for layered transition metal oxides. At high SOCs, the increased reactivity of delithiated oxide surfaces, as well as the increased driving force for cation mixing, promotes the formation of undesirable surface spinel and rocksalt phases. These surface phases possess lower specific capacities and compromised lithium diffusivities compared to the bulk layered structure, which contributes to impedance rise and capacity fading with continued cycling.

Cycling to high SOCs can also induce degradation at larger length scales. During lithium extraction, the unit cells of various NMC stoichiometries have been shown to experience significant anisotropic volumetric changes at high SOCs as the c lattice parameter collapses for x(Li)<0.5. Furthermore, lithium extraction at high voltages often results in serious compositional heterogeneity throughout the active material particle, which is a consequence of non-uniform distributions of interfacial chemical products, surface phases, and reaction sites. The resulting spatial gradients in lithium concentration, and thus molar volume, induce internal strains, which can be relieved through particle cracking and intergranular fracture. Beyond forming additional interfacial degradation sites, these cracks can also contribute to capacity fade as active material fragments become electrically isolated and therefore electrochemically inactive.

To improve the cycle life of nickel-rich cathode materials, coating layers such as Al$_2$O$_3$, MgO, ZrO$_2$, TiO$_2$, LiBO$_2$, and Li$_2$TiO$_3$ have been extensively explored. Coatings can act as interfacial buffer layers that scavenge HF from the electrolyte and shield the cathode surface from electrolyte decomposition reactions. While these layers are advantageous since they can be incorporated on the cathode surface via scalable methods such as atomic layer deposition or wet chemical routes, they often possess low ionic and/or electronic conductivity, which is detrimental to high-rate cycling. Additionally, since these coating layers are often directly bonded to the active material surface, SOC-dependent changes in the cathode unit cell volume can generate mechanical incompatibilities with the coating layer. At high SOCs, where changes in the unit cell volume are the most severe, even mechanical delamination of the surface coating can occur, rendering it irreversibly compromised for future cycles. Therefore, a thin, conductive, conformal coating that acts as an interfacial buffer layer while accommodating mechanical changes is likely to be more effective at enabling reliable high-voltage operation of nickel-rich cathodes.

Therefore, a heretofore unaddressed need exists in the art to address the aforementioned deficiencies and inadequacies.

SUMMARY OF THE INVENTION

In one aspect, this invention relates to a method for fabricating a composite material, comprising forming a mixture containing an active material, graphene, ethyl cellulose (EC) polymer and multiwalled carbon nanotubes (MWCNTs); and thermally annealing the mixture at an annealing temperature in an oxidizing environment to decompose the majority of EC, thereby resulting in the composite material having each active material particle coated with a conformal graphene coating. In one embodiment, the annealing temperature is in a range of about 150-350° C., preferably, about 250° C.

In one embodiment, said forming the mixture comprises dispersing the graphene, the EC polymer and the MWCNTs in a solvent to form a dispersion; mixing the active material with the dispersion to form a slurry; and drying the slurry.

In one embodiment, said forming the mixture further comprises exchanging said solvent with another solvent in the dispersion to promote better homogeneity and slurry stability during electrode casting. In one embodiment, said solvent comprises ethanol, and said another solvent comprises N-Methyl 2-pyrrolidone (NMP).

In one embodiment, said exchanging the solvent comprises adding said another solvent to the dispersion to form a mixed solution, and subsequently removing said solvent by stirring and/or heating the solution.

In one embodiment, said forming the mixture further comprises, prior to said mixing the active material, annealing the active material at a temperature in a range of about 150-350° C., preferably at about 250° C., in flowing oxygen.

In one embodiment, said drying the slurry comprises drying the slurry at a first temperature in a range of about 80-200° C. in a convection oven, followed by a second drying step at a second temperature in a range of about 50-120° C. under dynamic vacuum.

In one embodiment, said graphene comprises solution-exfoliated graphene.

In one embodiment, the active material comprises lithium cobalt oxide, lithium iron phosphate, lithium manganese oxide, lithium nickel oxide, lithium nickel manganese cobalt oxide, lithium nickel cobalt aluminum oxide, or a combination thereof.

In one embodiment, the active material comprises nickel-rich lithium oxides.

In one embodiment, the active material comprises lithium-rich oxides.

In one embodiment, the active material comprises $LiNi_{0.8}Co_{0.15}Al_{0.05}O_2$ (NCA), $LiNiO_2$ (LNO), $LiMn_{1.5}Ni_{0.5}O_4$ (LMNO), $LiNi_xMn_yCo_zO_2$ (NMC, where x+y+z=1), $LiNi_{0.8}Co_{0.2}O_2$ (LNCO), or $Li_wNi_xMn_yCo_zO_2$ (lithium-rich NMC, where w>1, x+y+z=1).

In one embodiment, the active material is doped with elements including Al, B, Zr, Nb, Fe, Cr, Cu, Mo, W, and/or V.

In another aspect, the invention relates to a composite material comprising graphene; and active material particles, wherein each surface of the active material particles is conformally coated with said graphene.

In one embodiment, the composite material further comprises MWCNTs.

In one embodiment, the composite material further comprises amorphous carbon with $sp^2$-carbon content that facilitates electron transport between graphene flakes.

In one embodiment, the amorphous carbon is an annealation product of ethyl cellulose.

In one embodiment, said graphene comprises solution-exfoliated graphene.

In one embodiment, the active material comprises lithium cobalt oxide, lithium iron phosphate, lithium manganese oxide, lithium nickel oxide, lithium nickel manganese cobalt oxide, lithium nickel cobalt aluminum oxide, or a combination thereof.

In one embodiment, the active material comprises nickel-rich lithium oxides.

In one embodiment, the active material comprises NCA, LNO, LMNO, NMC, LNCO, or lithium-rich NMC.

In one embodiment, the active material is doped with elements including Al, B, Zr, Nb, Fe, Cr, Cu, Mo, W, and/or V.

In yet another aspect, the invention relates to an electrode for an electrochemical device comprising a composite material comprising graphene, and active material particles, wherein each surface of the active material particles is conformally coated with said graphene.

In one embodiment, the composite material further comprises MWCNTs.

In one embodiment, the composite material further comprises amorphous carbon with $sp^2$-carbon content that facilitates electron transport between graphene flakes.

In one embodiment, the amorphous carbon is an annealation product of ethyl cellulose.

In one embodiment, the active material comprises lithium cobalt oxide, lithium nickel oxide, lithium iron phosphate, lithium manganese oxide, lithium nickel manganese cobalt oxide, lithium nickel cobalt aluminum oxide, lithium-rich oxides, or a combination thereof.

In one embodiment, the active material comprises nickel-rich lithium oxides.

In one embodiment, the active material comprises NCA, LNO, LMNO, NMC, LNCO, or lithium-rich NMC.

In one embodiment, the active material is doped with elements including Al, B, Zr, Nb, Fe, Cr, Cu, Mo, W, and/or V.

In one embodiment, the conformal graphene coating reduces the accumulation of electrolyte decomposition products on the active material surface and reduces the severity of particle-level chemomechanical degradation.

In one embodiment, the conformal graphene coating promotes spatially uniform charge transfer reactions across the electrode surface during cycling and mitigating mechanical degradation, which delocalizes delithiation-induced strain and reduces the propensity for particle fracture.

In one embodiment, the conformal graphene coating is mechanically compliant towards unit cell volume changes at high SOCs and maintains electrical contact throughout cycling, whereby the electrode achieves substantially improved cycle life and coulombic efficiencies when cycled to high operating voltages.

In one embodiment, the electrode has a discharge capacity of about 203.1 mAh during an activation cycle.

In one embodiment, the electrode retains about 70.9% of its initial volumetric capacity over 50 charge-discharge cycles at 0.5 C.

In yet another aspect, the invention relates to an electrochemical device, comprising the electrode as disclosed above. The electrochemical device in one embodiment is a battery.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
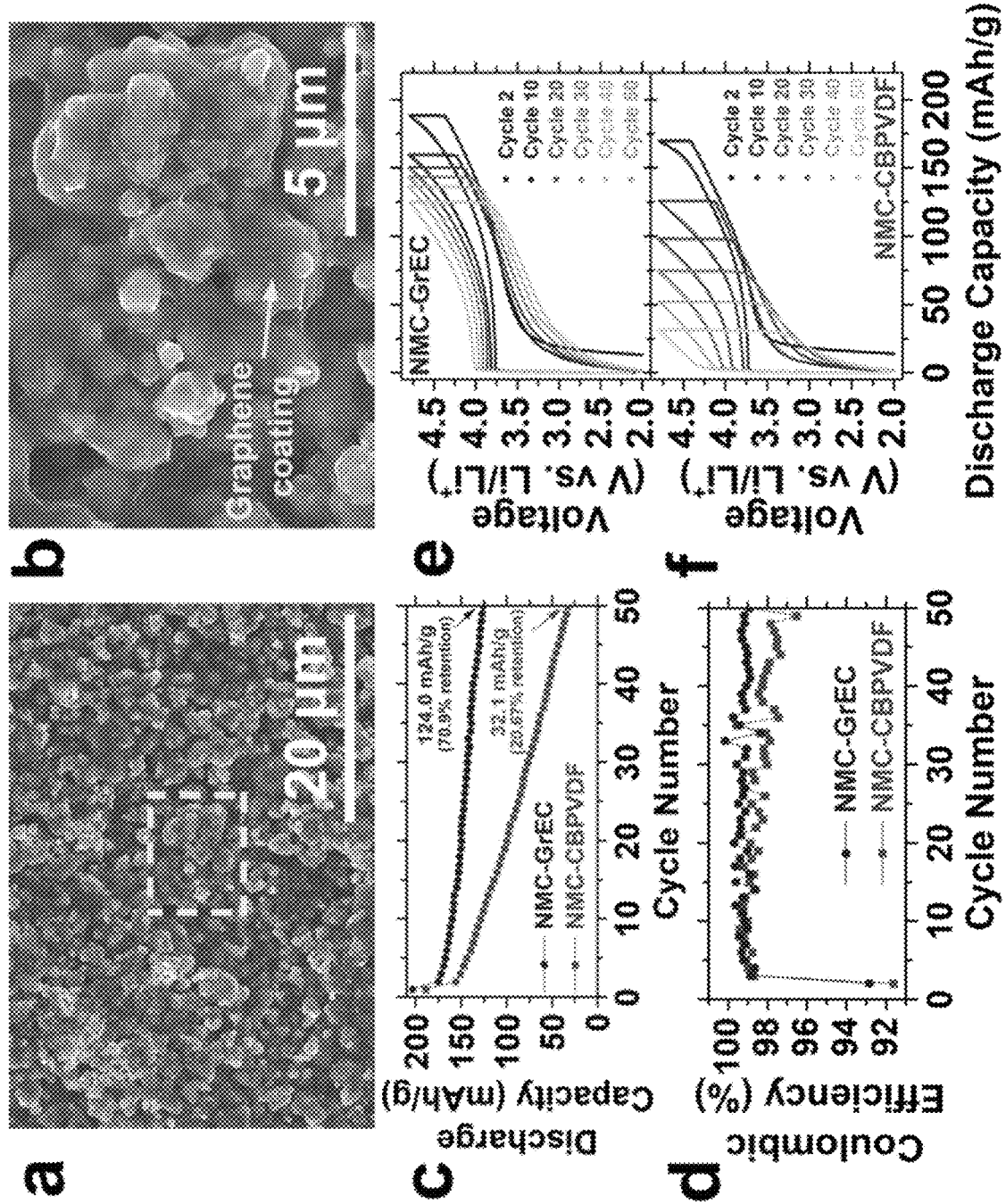
FIG. 1 shows morphology and electrochemical performance of graphene-coated NMC according to embodiments of the invention. Panel a: Top-down scanning electron microscope images of the NMC-GrEC electrode. Panel b: Higher magnification scanning electron microscope image of the dashed region outlined in yellow. Panels c-f: Electrochemical performance of NMC-GrEC and NMC-CBPVDF electrodes performed at 0.5 C: (panel c) Cycle life test; (panel d) Coulombic efficiency; (panel e, panel f) Voltage-capacity plots showing the evolution of electrode polarization for the NMC-GrEC electrode (panel e) and the NMC-CBPVDF electrode (panel f).

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this specification will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures. is turned over, elements described as being on the "lower" side of other elements would then be oriented on "upper" sides of the other elements. The exemplary term "lower", can, therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this specification, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification, and will not be interpreted in an idealized or overly formal sense unless expressly so defined herein.

As used in this specification, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this specification, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in a different order (or concurrently) without altering the principles of the invention.

Lithium-ion battery innovation efforts are targeted towards achieving performance metrics for next-generation battery applications, notably including electric vehicles. These applications demand battery packs with high energy densities to allow for longer vehicle ranges and longer lifetimes. Current cathode materials operate in a limited voltage window due to severe mechanical and chemical degradation when utilized at higher voltages, which lowers cycle life. Therefore, significant effort has been placed on finding analogous materials possessing greater energy densities that operate in the same voltage window. However, another way to achieve higher energy density electrodes is to stabilize high-voltage operation, allowing greater lithium utilization and increasing cell capacity. The graphene coating scheme according to the invention can stabilize high-voltage operation by simultaneously reducing mechanical and chemical degradation. This graphene coating is easily processable, based on low-cost carbon, and can be generally applied to enhance the electrochemical performance of virtually any battery electrode material. The coating according to the invention is also electrically conductive, making it advantageous over incumbent coating technologies based on oxide layers, which possess low electrical conductivity and are prone to mechanical degradation at high voltages.

Nickel-rich layered oxides, such as lithium nickel manganese cobalt oxides (NMCs), are promising cathode active materials for high-performance lithium-ion batteries (LIBs). Although these materials are stable at mild operating voltage windows (up to 4.3 V vs. Li/Li$^+$), stable cycling at high voltages (>4.7 V vs. Li/Li$^+$) to access additional capacity has not yet been widely demonstrated. At high potentials, NMC degradation is tied to electrolyte decomposition reactions, formation of high-impedance surface phases, non-uniform buildup of chemomechanical strains, and severe mechanical instabilities. By applying a conformal graphene coating on the surface of NMC primary particles, Significant enhancement in the high-voltage cycle life and coulombic efficiency for this material system are observed. A systematic evaluation of NMC degradation mechanisms reveals that these performance improvements can be attributed to suppressed electrolyte decomposition and reduced chemomechanical degradation, particularly lower occurrence of particle fracture and electrochemical creep. Various aspects of this invention, among other things, disclose a relationship between the spatial uniformity of lithium flux and particle-level mechanical degradation, and show that a conformal graphene coating is uniquely suited to address these issues. These results delineate a pathway for rationally mitigating high-voltage chemomechanical degradation of nickel-rich cathodes that can likely be applied to additional classes of battery materials.

In one aspect, the invention relates to a method for fabricating a composite material, comprising forming a mixture containing an active material, graphene, ethyl cellulose (EC) polymer and multiwalled carbon nanotubes (MWCNTs); and thermally annealing the mixture at an annealing temperature in an oxidizing environment to decompose the majority of EC, thereby resulting in the composite material having each active material particle coated with a conformal graphene coating. In one embodiment, the annealing temperature is in a range of about 150-350° C., preferably, about 250° C.

In one embodiment, said forming the mixture comprises dispersing graphene, EC polymer and MWCNTs in a solvent to form a dispersion; mixing the active material with the dispersion to form a slurry; and drying the slurry.

In one embodiment, said forming the mixture further comprises exchanging said solvent with another solvent in the dispersion to promote better homogeneity and slurry stability during electrode casting. In one embodiment, said solvent comprises ethanol, and said another solvent comprises N-Methyl 2-pyrrolidone (NMP).

In one embodiment, said exchanging the solvent comprises adding said another solvent to the dispersion to form a mixed solution, and subsequently removing said solvent by stirring and/or heating the solution.

In one embodiment, said forming the mixture further comprises, prior to said mixing the active material, annealing the active material at a temperature in a range of about 150-350° C., preferably at about 250° C., in flowing oxygen.

In one embodiment, said drying the slurry comprises drying the slurry at a first temperature in a range of about 80-200° C. in a convection oven, followed by a second drying step at a second temperature in a range of about 50-120° C. under dynamic vacuum.

In one embodiment, said graphene comprises solution-exfoliated graphene.

In one embodiment, the active material comprises lithium cobalt oxide, lithium iron phosphate, lithium manganese oxide, lithium nickel oxide, lithium nickel manganese cobalt oxide, lithium nickel cobalt aluminum oxide, or a combination thereof.

In another aspect, the invention relates to a composite material comprising graphene; and active material particles, wherein each surface of the active material particles is conformally coated with said graphene.

In one embodiment, the composite material further comprises amorphous carbon with sp$^2$-carbon content that facilitates electron transport between graphene flakes.

In one embodiment, the amorphous carbon is an annealation product of ethyl cellulose.

In one embodiment, said graphene comprises solution-exfoliated graphene.

In one embodiment, the active material comprises lithium cobalt oxide, lithium iron phosphate, lithium manganese oxide, lithium nickel oxide, lithium nickel manganese cobalt oxide, lithium nickel cobalt aluminum oxide, or a combination thereof.

In one embodiment, the active material comprises nickel-rich lithium oxides.

In one embodiment, the active material comprises lithium-rich oxides.

In one embodiment, the active material comprises $LiNi_{0.8}Co_{0.15}Al_{0.05}O_2$ (NCA), $LiNiO_2$ (LNO), $LiMn_{1.5}Ni_{0.5}O_4$ (LMNO), $LiNi_xMn_yCo_zO_2$ (NMC, where x+y+z=1), $LiNi_{0.5}Co_{0.2}O_2$ (LNCO), or $Li_wNi_xMn_yCo_zO_2$ (lithium-rich NMC, where w>1, x+y+z=1).

In one embodiment, the active material is doped with elements including Al, B, Zr, Nb, Fe, Cr, Cu, Mo, W, and/or V.

In yet another aspect, the invention relates to an electrode for an electrochemical device comprising a composite material as disclosed above, wherein each surface of the active material particles is conformally coated with said graphene.

In one embodiment, the conformal graphene coating reduces the accumulation of electrolyte decomposition products on the active material surface and reduces the severity of particle-level chemomechanical degradation.

In one embodiment, the conformal graphene coating promotes spatially uniform charge transfer reactions across the electrode surface during cycling and mitigating mechanical degradation, which delocalizes delithiation-induced strain and reduces the propensity for particle fracture.

In one embodiment, the conformal graphene coating is mechanically compliant towards unit cell volume changes at high SOCs and maintains electrical contact throughout cycling, whereby the electrode achieves substantially improved cycle life and coulombic efficiencies when cycled to high operating voltages.

In one embodiment, the electrode has a discharge capacity of about 203.1 mAh g$^{-1}$, during an activation cycle. This result suggests that the conformal graphene coating enabled increased lithium utilization from the NMC lattice.

In one embodiment, the electrode retains about 70.9% of its initial volumetric capacity over 50 charge-discharge cycles at 0.5 C.

In yet another aspect, the invention relates to an electrochemical device, comprising the electrode as disclosed above. The electrochemical device in one embodiment is a battery.

Among other things, the invention provides a number of advantages.

Incumbent strategies to stabilize high-voltage operation of Ni-rich layered cathode materials are often based on coated oxide layers, which possess low electrical conductivity and are prone to cracking and delamination from the cathode material during high-voltage operation. These strategies are therefore unsuitable for high-voltage and high-rate performance. Since the graphene coating according to the invention possesses high electrical conductivity and promotes spatially uniform lithium-ion flux, stable high-voltage operation with fast kinetics and record Coulombic efficiency is shown.

Other reported strategies to improve high-voltage stability also include new electrolyte formulations, which are relatively difficult to implement in current production lines due to additional safety and equipment considerations associated with such chemistries. In contrast, graphene-coated powders act as a drop-in replacement for incumbent cathode powders, making this strategy immediately relevant for battery manufacturing.

The invention can be applied in, but not limited to, lithium-ion batteries, graphene coating or graphene encapsulation, cathode materials, high-power/high-energy density electrodes, conductive additives, intercalation materials, mitigating chemomechanical degradation, and so on.

These and other aspects of the invention are further described below. Without intent to limit the scope of the invention, exemplary instruments, apparatus, methods, and their related results according to the embodiments of the invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE

Elucidating and Mitigating High-Voltage Chemomechanical Degradation of Nickel-Rich Lithium-Ion Battery Cathodes Via Conformal Graphene Coating This exemplary study demonstrates a strategy to enhance the high-voltage cycle life and Coulombic efficiency of NMC cathodes via a conformal, conductive graphene coating. Analysis of the electrode surface with X-ray photoelectron spectroscopy (XPS) and electron microscopy reveals that the graphene coating reduces the accumulation of electrolyte decomposition products on the NMC surface and reduces the severity of particle-level chemomechanical degradation. By using primary particles, contributions to reaction inhomogeneities that would otherwise interfere with this analysis in secondary particle systems, such as electrolyte penetration into secondary particles or the generation of non-uniform strains, are minimized. The graphene coating promotes spatially uniform charge transfer reactions across the electrode surface, which delocalizes delithiation-induced strain and reduces the propensity for particle fracture. Additionally, the graphene coating is mechanically compliant towards unit cell volume changes at high states of charge and maintains electrical contact throughout cycling. As a result, NMC cathodes that are conformally coated with graphene achieve substantially improved cycle life and coulombic efficiencies when cycled to high operating voltages.

Methods

NMC Synthesis: A solid-state co-precipitation method was used to synthesize the NMC532 active material. Ni (II) acetate tetrahydrate, Mn (II) acetate tetrahydrate, and Co (II) acetate tetrahydrate precursors (MilliporeSigma) were dissolved in deionized water in a 5:3:2 molar ratio, yielding a 0.2 M transition metal precursor solution. At the same time, oxalic acid dihydrate (MilliporeSigma) was dissolved in deionized water to form a 0.1 M solution of oxalic acid. After 10 minutes of stirring at 300 RPM, the oxalic acid solution was added dropwise to precipitate the precursors from the solution. The mixture was then further stirred at 300 RPM for 3 hours before the water was evaporated using a rotary evaporator (Buchi Rotavapor R-300 System). The resulting powder was dried overnight under dynamic vacuum at 80° C., and then subsequently calcined at 450° C. under 50 sccm of flowing oxygen for 6 hours using a tube furnace (Thermo Scientific Lindberg Blue M). After the powder cooled to room temperature, lithium hydroxide monohydrate (MilliporeSigma) was added in 3 mol % excess and uniformly mixed into the powder using a mortar and pestle. The final powder mixture was calcined under flowing oxygen at 550° C. for 8 hours, and then was subsequently heated to 850° C. for 12 hours, ultimately yielding stoichiometric NMC532. All ramp rates used were 5° C./min.

Graphene Exfoliation: The graphene/ethyl cellulose (graphene/EC) powder was prepared by mixing 100 g of 150 mesh flake graphite (MilliporeSigma), 6 g of ethyl cellulose powder (4 cP, MilliporeSigma), and 1 L of 200-proof ethanol (Decon Labs) using a Silverson L5M-A shear mixer for 2 hours at 10,230 RPM. Large, unexfoliated graphite flakes were removed from the dispersion by centrifuging at 7,500 RPM for 20 minutes using a Beckman Coulter J26 XPI centrifuge. Following centrifugation, the supernatant was harvested and flocculated by adding a solution of NaCl in water (0.04 g/mL) to reach a final ratio of 1.74:1 graphene dispersion:sodium chloride solution. This mixture was then centrifuged again at 7,500 RPM for 7 minutes to sediment the graphene/ethyl cellulose powder. The powder was collected, thoroughly rinsed with deionized water to remove residual sodium chloride, vacuum filtered, and dried under an infrared lamp overnight. Thermogravimetric analysis revealed that the resulting powder possessed a graphene fraction of approximately 33 wt. %.

Electrode Fabrication: The NMC-CPBVDF electrode slurry was prepared by homogeneously mixing a 90:5:5 weight ratio of NMC, Super P (Alfa Aesar), and polyvinylidene fluoride (PVDF, MTI Corporation) with N-Methyl 2-pyrrolidone (NMP, MilliporeSigma) using a centrifugal mixer (Thinky USA). To promote better homogeneity and viscosity in the electrode slurry, PVDF was first mixed with NMP at 80° C. overnight to form a 6 wt. % solution. To fabricate the graphene electrodes (NMC-GrEC), graphene/EC powder and multiwalled carbon nanotubes (MWCNT, MilliporeSigma) were dispersed in ethanol for 1 hour using a Fisher Scientific Sonic Dismembrator Model 500 set at a power output of 40 W. To match the carbon content of the control electrode (i.e., 5% conductive carbon), a 95:4.5:0.5 ratio of NMC, graphene, and MWCNT was used. Here, a small amount of MWCNT was added to improve the mechanical integrity of the binder-free electrode. To promote better homogeneity and slurry stability during electrode casting, a solvent exchange with NMP was performed. NMP was added to the graphene/EC-MWCNT-ethanol dispersion, and the ethanol was subsequently removed by stirring the graphene/EC-MWCNT-NMP-ethanol solution on a hot plate set at 70° C. Following the solvent exchange, NMC powder was annealed at 250° C. for 1 hour in flowing oxygen, and then mixed with the exfoliated graphene/EC-MWCNT solution using a centrifugal mixer (Thinky, USA). Both slurries were cast onto aluminum foil and dried at 120° C. in a convection oven, followed by a second drying step at 80° C. under dynamic vacuum. The average active material loadings for both the NMC-CBPVDF and the NMC- GrEC electrodes were maintained at ~3 mg cm$^{-2}$. Electrode discs were punched out and calendered with approximately 6 MPa applied pressure. A micrometer (Mituyo) was used to measure the thickness of the electrodes. For NMC-GrEC electrodes, ethyl cellulose was removed from the electrodes via thermal annealing at 250° C. in flowing oxygen for 1 hour. 2032-type two-electrode coin cells were assembled in an Ar glovebox (VAC Omni-Lab) versus a lithium (Alfa Aesar) counter electrode and 1 M LiPF$_6$ in 1:1 vol/vol ethylene carbonate/ethyl methyl carbonate (EC/EMC, MilliporeSigma) as the electrolyte. The separator used was Celgard 2325.

Electrochemical Characterization: Galvanostatic cycling was performed between 2.0 V and 4.8 V vs. Li/Li+ using an Arbin LBT-20084 battery cycler. Prior to data acquisition, electrodes were activated using a 0.1 C constant current-constant-voltage (CCCV) protocol. Specifically, after a galvanostatic step, cells were held at the respective cutoff voltage until the current reached C/20. Rate capability tests were performed using a constant charge-fast discharge protocol. Electrochemical impedance spectroscopy measurements were performed on fully charged electrodes using a Bio-Logic VSP potentiostat between 1 MHz and 1 mHz. Distribution of relaxation times analysis was performed using the DRTtools MATLAB toolbox.

Raman Spectroscopy: Raman spectra were collected with a Horiba Scientific XploRA PLUS Raman microscope with a 532 nm laser excitation wavelength at 16.75 mW laser power and an 1800 g/mm grating for 20 seconds.

X-Ray Diffraction: Synchrotron radiation powder X-ray diffraction (SR-PXRD) experiments were carried out on Beamline 5-BMC at the Advanced Photon Source (APS) at an energy of 19.97 keV ($\lambda$=0.6208 Å). After cycling, NMC powder was harvested from cycled electrodes inside an Ar glovebox. The powders were then transferred into capillaries and sealed shut. During acquisition, the capillaries were continuously rotated about a horizontal axis. The incoming X-ray beam spot size was 2×8 mm$^2$. The powder diffractometer was employed in a high-resolution Bragg-Brentano geometry with a double bounce pseudo-channel-cut crystal configuration of two Si(111) crystals. In the detector arm, an anti-scatter flight tube followed by Soller slits with a vertical blade were employed to limit horizontal axial divergence. To improve resolution, a Ge(220) analyzer crystal was utilized before acquiring the signal with an Oxford Cyberstar scintillation counter. Rietveld analysis was performed with GSAS-II software. The refined parameters were the lattice constants (a and c), sample displacement, crystallite size and microstrain (both isotropic), and the Ni in Li site fraction. The standard reference material LaB$_6$ was utilized to obtain the appropriate instrument profile parameters of the setup.

Inductively Coupled Plasma Mass Spectrometry: To analyze the transition metal ratio of the synthesized NMC, a small amount of synthesized NMC powder was added directly into a 50/50 mixture of trace-grade nitric acid and hydrochloric acid. After complete digestion of the powder overnight at 65° C., ultrapure water was added to dilute the solution to a 4% (v/v) acid concentration in a sample volume of 10 mL. To quantify transition metal dissolution in pristine samples, NMC-GrEC and NMC-CBPVDF electrodes with the same active material mass loading were each immersed in 1 mL of 1 M LiPF$_6$ in 1:1 vol/vol ethylene carbonate/ethyl methyl carbonate (EC/EMC, MilliporeSigma), sealed under argon, and placed in an oven at 60° C. Two replicates were made for each sample. After seven days, the electrolyte was harvested and digested overnight using trace-grade nitric acid in a water bath set at 65° C. Following digestion, the solution was diluted to a 3% (v/v) acid concentration in a 5 mL sample volume. All ICP analysis was performed using a ThermoFisher iCAP Q ICP-MS.

X-Ray Photoelectron Spectroscopy: Postmortem X-Ray photoelectron spectroscopy measurements were performed using a Thermo Scientific ESCALAB 250 Xi+ system (Al K$\alpha$ radiation, ~1486.6 eV) at a pressure of ~5×10$^{-8}$ Torr. Acquisition was performed using a 900 μm spot size. Samples were charge compensated with a flood gun. To prepare samples for XPS analysis, coin cells were disassembled inside an Ar glovebox and thoroughly rinsed with dimethyl carbonate. After drying on a hot plate inside the glovebox at 120° C. for 48 hours, the electrodes were transferred into the XPS analysis chamber using a sealed transfer vessel to prevent ambient exposure. All peaks were charge corrected to adventitious carbon at 284.8 eV.

Scanning Electron Microscopy: Scanning electron microscopy was performed using a Hitachi SU8030 SEM. Cross-sectional samples were prepared by immersing electrode discs in liquid nitrogen for 20 seconds prior to cleaving with a razor blade. The electrochemical creep and fracture analysis was performed at various points across the surfaces of the NMC-CBPVDF and NMC-GrEC electrodes to ensure that representative statistics were acquired. Approximately 2,000 particles were assessed for electrochemical creep and fracture in both electrode compositions. Particles were considered to be fractured if the gap distance formed by particle fracture was ~10 nm or greater. Similarly, particles were considered to have experienced electrochemical creep only if a terraced morphology was evident on the surface. Since a thick layer of graphene flakes could obfuscate the NMC surface during SEM analysis, both electrodes were slightly scratched using a razor blade to allow imaging of particles buried in the interior of the electrode. Particle surfaces on both the NMC-CBPVDF and NMC-GrEC electrodes were then analyzed in various regions on the electrode surface and subsurface.

Scanning Transmission Electron Microscopy: Harvested electrodes were prepared for postmortem scanning transmission electron microscopy (STEM) analysis by focused ion beam (FIB) milling on a FEI Helios Nanolab SEM/FIB. STEM investigations were performed using a JEOL JEM ARM200CF aberration-corrected STEM that was operated at 200 kV.

Material Characterization

Figure 6:
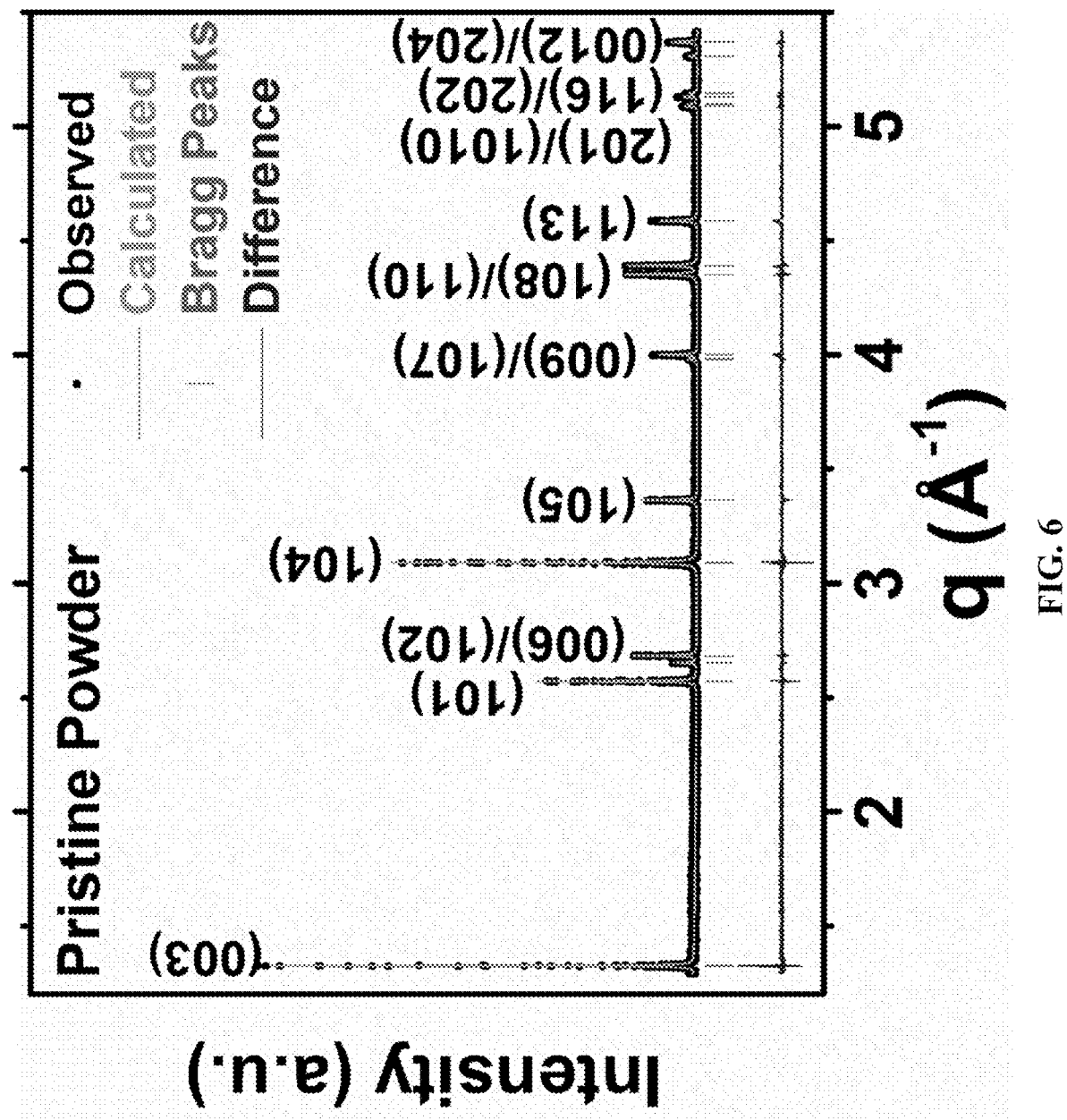
FIG. 6 shows synchrotron radiation powder X-ray diffraction pattern of the as-synthesized NMC according to embodiments of the invention. The magnitude of the scattering vector is $q=4\pi \sin(\theta/\lambda)$ where $2\theta$ is the scattering angle and $\lambda$ is the X-ray wavelength.
Figure 7:
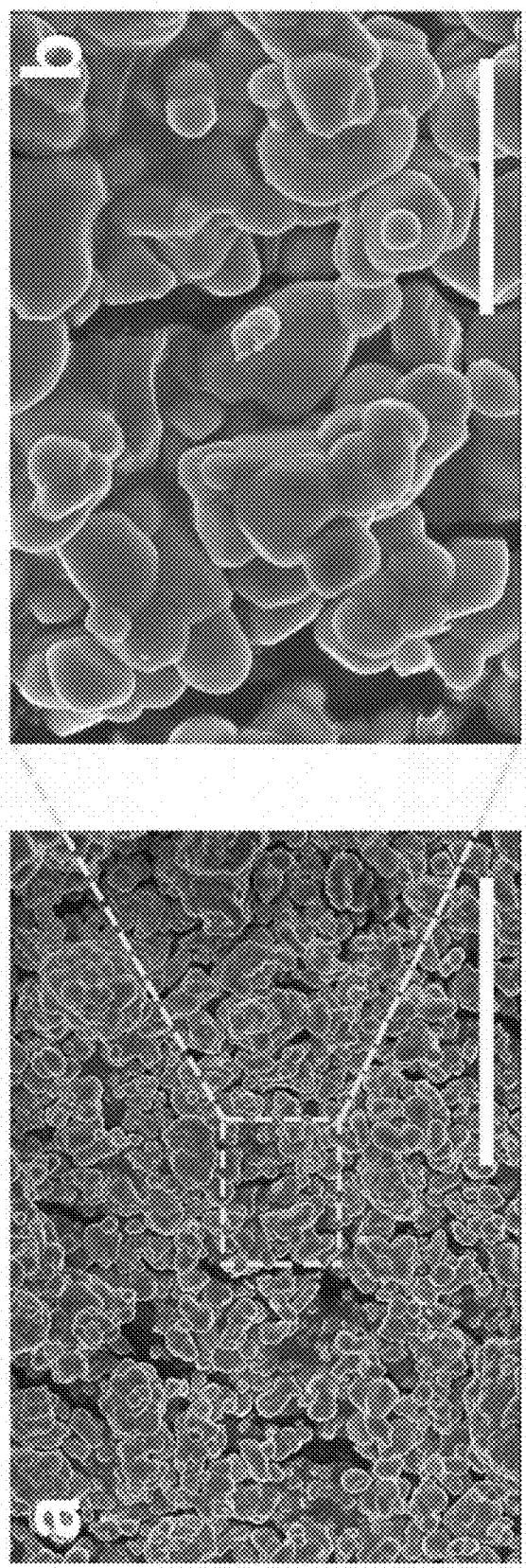
FIG. 7 shows scanning electron microscope images showing the morphology of the as-synthesized NMC powder according to embodiments of the invention. Higher magnification is shown in panel b. Scale bars are 10 μm in panel a, and 2 μm in panel b.

NMC532 particles were synthesized using a solid-state co-precipitation method as disclosed above. Synchrotron radiation powder X-ray diffraction (SR-PXRD) verified the synthesis of layered NMC532 (R-3m) with no significant evidence of impurity phases. Additional features in the SR-PXRD pattern, including (006)/(102) peak splitting, confirmed the synthesis of a layered structure, as shown in FIG. 6. Rietveld refinement indicated that the lattice parameters of the as-synthesized NMC agreed well with previously published work (Table 1). Inductively coupled plasma mass spectrometry (ICP-MS) was used to quantify the NMC transition metal ratio, which confirmed the target composition of 50% nickel, 30% manganese, and 20% cobalt, as shown in Table 2. Scanning electron microscopy (SEM) showed that the synthesized powder was composed of primary particles with sizes ranging from hundreds of nanometers to 1 micron in diameter, as shown in FIG. 7. These primary particles occasionally formed small aggregates with sizes of less than 5 microns in diameter, but no well-defined, long-range secondary particle structures were observed.

TABLE 1

Rietveld refinement results for the pristine NMC powder, the cycled NMC-CBPVDF electrode, and the cycled NMC-GrEC electrode.

| Sample | Lattice parameters (Å) a | C | Li/Ni mixing | Domain size (μm) | Microstrain | RF, RF$^2$ (%) |
|---|---|---|---|---|---|---|
| Pristine NMC powder | 2.8659(3) | 14.224(1) | 3.56% | 0.7082 | 2027.5 | 8.89, 15.10 |
| NMC-CBPVDF after 50 cycles | 2.8595(7) | 14.298(2) | 1.17% | 0.4237 | 3285.7 | 5.94, 11.26 |
| NMC-GrEC after 50 cycles | 2.8626(5) | 14.214(2) | 1.93% | 0.7613 | 1827.2 | 6.64, 9.77 |

TABLE 2

Transition metal ratio of the synthesized NMC powder determined via inductively coupled plasma mass spectrometry.

|  | Ni | Mn | Co |
|---|---|---|---|
| Average ICP Sample (ppb) | 23109 | 13801 | 9898 |
| Percentages | 49.37% | 29.48% | 21.15% |
| Target for NMC532 | 50% | 30% | 20% |

Figure 8:
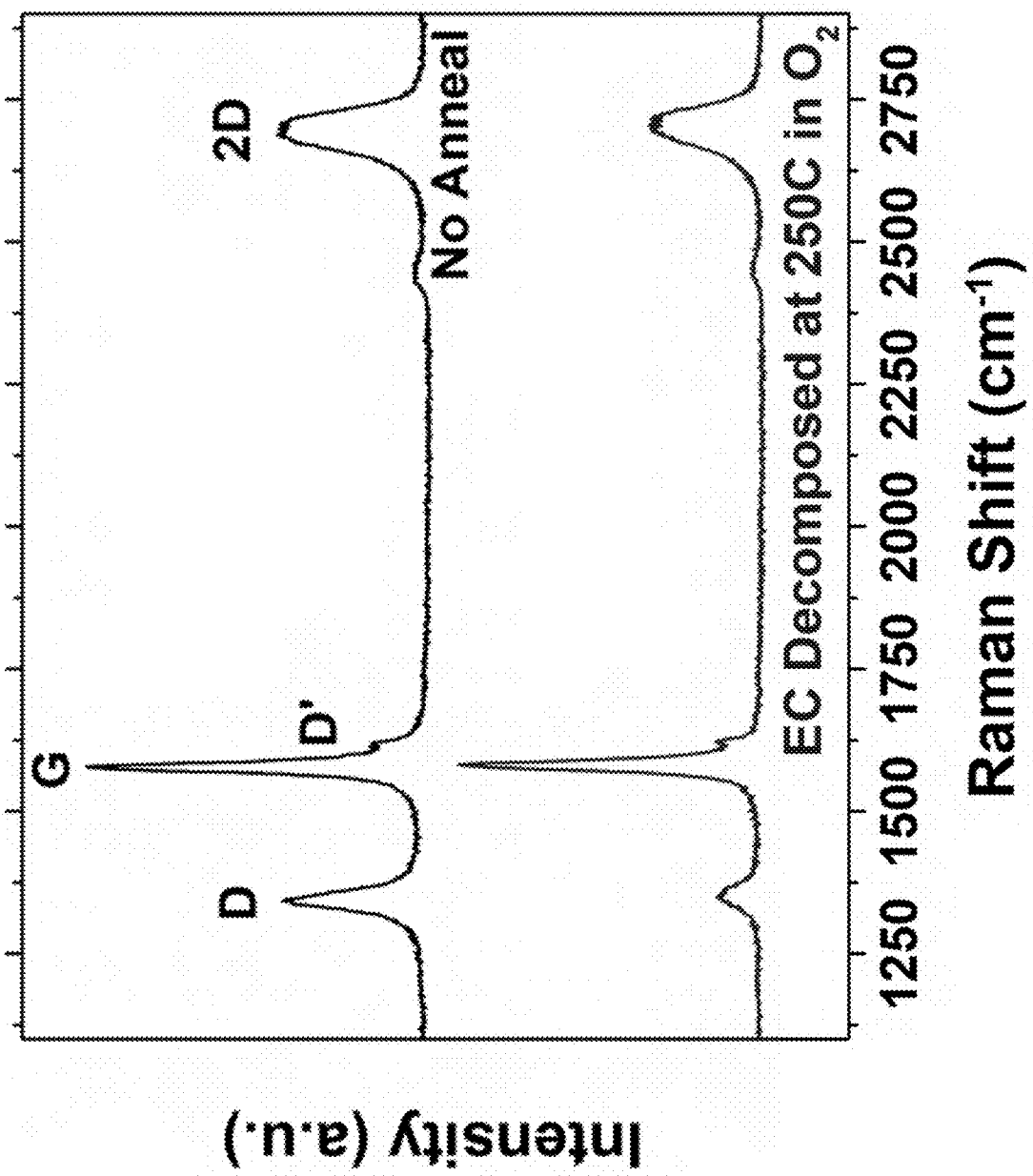
FIG. 8 shows Raman spectra of the NMC-GrEC electrodes before and after the thermal decomposition of the ethyl cellulose polymer according to embodiments of the invention.

Following synthesis, the NMC particles were uniformly coated with graphene and ethyl cellulose (GrEC) using a previously established solution-phase method. The quality and conformality of the coating were confirmed using SEM, as shown in panels a-b of FIG. 1. After fabricating electrodes with the GrEC powder (NMC-GrEC), the electrode was heated to pyrolyze the ethyl cellulose (EC) polymer. This heating step largely volatilizes the EC, leading to compaction of the electrode and resulting in a conductive amorphous carbon residue that helps form a percolating, electrically conductive network among the graphene-coated NMC particles. Raman spectroscopy of the electrode following thermal decomposition of the EC polymer confirmed that the ratio of the D and G peaks decreased (at 1350 cm$^{-1}$ and 1580 cm$^{-1}$, respectively), as shown in FIG. 8, suggesting that EC decomposition resulted in a more graphitic carbon network that is ideal for efficient charge transfer. The uncoated NMC powder was also mixed with carbon black (CB) and polyvinylidene fluoride (PVDF) to fabricate control electrodes (NMC-CBPVDF).

Electrochemical Characterization

Galvanostatic Cycling: The cycle life behaviors of the NMC-GrEC and the NMC-CBPVDF electrodes were investigated via galvanostatic cycling. Panel c of FIG. 1 shows the cycle life results for samples charged to an upper cutoff voltage of 4.8 V vs. Li/Li$^+$. During the activation cycle, the NMC-GrEC electrode achieved a discharge capacity of 203.1 mAh g$^{-1}$, whereas the NMC-CBPVDF control electrode discharge capacity reached only 188.1 mAh g$^{-1}$. Since both electrodes possessed similar areal active material loadings (~3 mg cm$^{-1}$), this result suggests that the conformal graphene coating enabled increased lithium utilization from the NMC lattice. After 50 charge-discharge cycles at 0.5 C, the NMC-GrEC electrode retained 70.9% of its original capacity, which was far superior to the 20.7% capacity retention observed for the NMC-CBPVDF control electrode. This poor cycle life was likely related to the exacerbated degradation associated with the high primary particle surface area and high operating voltage of the cell.

The coulombic efficiency results shown in panel d of FIG. 1 also highlight the improved charge-discharge behavior of the NMC-GrEC electrodes. The first cycle coulombic efficiency was higher for the NMC-GrEC electrode (94.49%) than for the NMC-CBPVDF electrode (92.9%), which implies that the NMC-GrEC electrode lost fewer lithium ions to parasitic side reactions as the solid-electrolyte interphase (SEI) formed during the first cycle. This first cycle coulombic efficiency is the highest reported among the many coating and doping strategies that have been attempted for NMC532 half cells at voltages beyond 4.6 V vs. Li/Li$^+$, as shown in Table 3. With additional cycling, the coulombic efficiency of the NMC-GrEC electrode remained consistent after 50 cycles. In contrast, the coulombic efficiency of the NMC-CBPVDF electrode began to drop after the 30$^{th}$ cycle. As a result, the average coulombic efficiency of the NMC-GrEC electrode (99.68%) remained considerably higher than the average coulombic efficiency of the NMC-CBPVDF electrode (98.57%).

TABLE 3

Comparison of first cycle efficiencies among various reported strategies to stabilize the high-voltage cycling of NMC532.

| Strategy | Type | C-rate | Lower Cutoff Voltage (vs. Li/Li$^+$) | Upper Cutoff Voltage (vs. Li/Li$^+$) | Active Material Fraction in Electrode | Particle Size (um) | Loading (mg cm$^{-2}$) | FCE (%) |
|---|---|---|---|---|---|---|---|---|
| LiTiO$_3$ coating (8%) [1] | Coating | 0.2 | 2.8 | 4.6 | 80% | 5 | 2.5-3.5 | 85.5 |
| LiTiO$_3$ coating (6%) [1] | Coating | 0.2 | 2.8 | 4.6 | 80% | 5 | 2.5-3.5 | 86.1 |
| LiTiO$_3$ coating (3%) [1] | Coating | 0.2 | 2.8 | 4.6 | 80% | 5 | 2.5-3.5 | 86.1 |

TABLE 3-continued

Comparison of first cycle efficiencies among various reported strategies to stabilize the high-voltage cycling of NMC532.

| Strategy | Type | C-rate | Lower Cutoff Voltage (vs. Li/Li$^+$) | Upper Cutoff Voltage (vs. Li/Li$^+$) | Active Material Fraction in Electrode | Particle Size (um) | Loading (mg cm$^{-2}$) | FCE (%) |
|---|---|---|---|---|---|---|---|---|
| Li$_3$VO$_4$ [2] | Coating | 0.1 | 2.8 | 4.6 | 80% | — | — | 96.1 |
| ALD Al$_2$O$_3$ [3] | Coating | 0.1 | 3 | 4.6 | 93% | 10-15 | 2.5 | 84.2 |
| LiAlO$_2$ 1 mol % [4] | Coating | 1 | 2.7 | 4.6 | 85% | 5 | 2 | 84.6 |
| LiAlO$_2$ 2 mol % [4] | Coating | 1 | 2.7 | 4.6 | 85% | 5 | 2 | 87.0 |
| LiAlO$_2$ 3 mol % [4] | Coating | 1 | 2.7 | 4.6 | 85% | 5 | 2 | 78.7 |
| NaTi$_2$(PO$_4$)$_3$ [5] | Coating | 0.2 | 3 | 4.6 | 80% | 10-15 | 15 | 86.7 |
| Zr doping and polypyrrole coating [6] | Coating and Doping | 1 | 3 | 4.6 | 80% | 10-20 | — | 84.1 |
| Nano-LFP coating with carbon nanotubes [7] | Core-Shell | 0.1 | 3 | 4.6 | 80% | 10-15 | — | 87.0 |
| Nd-doping (0.4%) [8] | Doping | 0.2 | 2.8 | 4.6 | 80% | 10 | 3-4 | 82.3 |
| Nd-doping (0.8%) [8] | Doping | 0.2 | 2.8 | 4.6 | 80% | 10 | 3-4 | 84.4 |
| Nd-doping (1.2%) [8] | Doping | 0.2 | 2.8 | 4.6 | 80% | 10 | 3-4 | 82.2 |
| Zr doping [6] | Doping | 1 | 3 | 4.6 | 80% | 10-20 | — | 84.3 |
| LiBF$_4$ (0.93 mol/kg) [9] | Electrolyte salt | 0.1 | 3 | 4.6 | 80% | 10-15 | — | 82.6 |
| LiBF$_4$ (3.7 mol/kg) [9] | Electrolyte salt | 0.1 | 3 | 4.6 | 80% | 10-15 | — | 86.5 |
| LiBF$_4$ (8.67 mol/kg) [9] | Electrolyte salt | 0.1 | 3 | 4.6 | 80% | 10-15 | — | 88.9 |
| ALD Al$_2$O$_3$ [3] | Coating | 1 | 2 | 4.8 | 93% | 10-15 | 2.5 | 88.2 |
| CNT 5%, filtered [10] | Composite | 0.1 | 3 | 4.8 | 80% | 5-10 | — | 77.1 |
| CNT 5% [10] | Composite | 0.1 | 3 | 4.8 | 80% | 5-10 | — | 78.3 |
| Nd-doping (1-2%) [8] | Doping | 1 | 2.8 | 4.8 | 80% | 10 | 3-4 | 58.0 |
| 0.5 wt % p-toluenesulfonyl isocyanate (PTSI) [11] | Electrolyte additive | 1 | 3 | 4.8 | 80% | 10-15 | 1.2 | 71.1 |
| Graphene-EC (this work) | Coating | 0.1 | 2 | 4.8 | 95% | <1 um | 3 | 94.5 |

The voltage-capacity plot indicates that the charge-discharge behavior was relatively stable for the NMC-GrEC electrode, as shown in panel e of FIG. 1), with only a mild polarization increase over 50 cycles. On the other hand, the sudden drift of the voltage shoulder (initially at ~3.7 V vs. Li/Li$^+$) to higher values during cycling indicates that the inferior cycle life for the NMC-CBPVDF electrode was related to a significant increase in electrode polarization during cycling, as shown in panel f of FIG. 1. This observation is corroborated by the increasing magnitude of the ohmic drop as the current switched from charge to discharge. At the 50$^{th}$ cycle, the ohmic drop of the NMC-CBPVDF electrode increased dramatically to approximately 1.5 V, corresponding to over half of the voltage window of the cell, while the 50$^{th}$ cycle ohmic drop for the NMC-GrEC electrode was only 1 V. These results suggest that as the NMC-CBPVDF electrode was charged, fewer lithium ions than expected were extracted before the cutoff voltage was reached, limiting the overall per-cycle reversible capacity. In fact, the 50$^{th}$ cycle capacity of the NMC-GrEC electrode and the 10$^{th}$ cycle capacity of the NMC-CBPVDF electrode were nearly equivalent.

Figure 9:
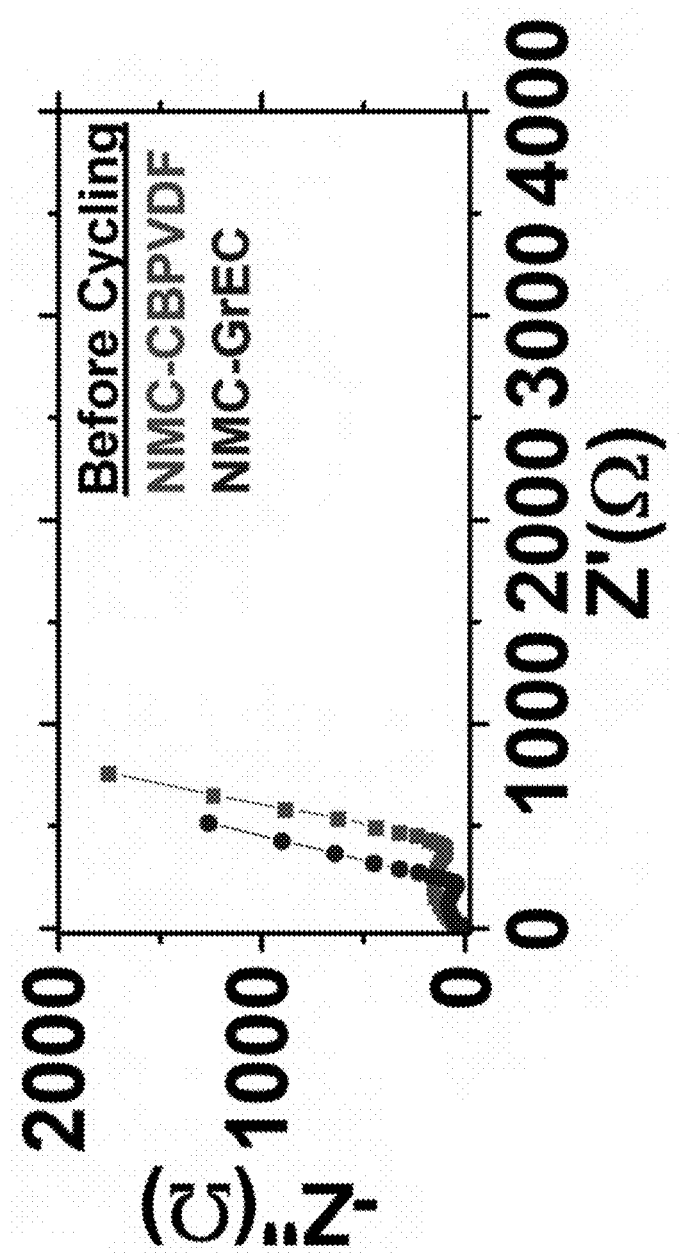
FIG. 9 shows complete EIS data for the NMC-CBPVDF and NMC-GrEC electrodes acquired before cycling.

Electrochemical Impedance Spectroscopy: To investigate the observed improvements in the high-voltage cycling and charge-discharge behavior for graphene-coated NMC, electrochemical impedance spectroscopy (EIS) and corresponding equivalent circuit modeling were utilized to quantify changes in cell impedance. Distribution function of relaxation times (DRT) analysis was also performed to accurately determine the polarization processes and the corresponding frequencies in the EIS response. The Nyquist plots for the NMC-CBPVDF and NMC-GrEC cells before cycling both show one semicircle followed by the diffusion region, as shown in panel a of FIG. 2 and FIG. 9). According to the corresponding DRT data (FIG. 10), the semicircle was deconvoluted with three processes occurring at high and medium frequencies, which correspond to the electrode-current collector interface ($P_1$ at ~10$^5$ Hz), lithium metal-electrolyte interface ($P_2$ at ~10$^2$ Hz), and electrode-electrolyte interface ($P_3$ at ~5 Hz), respectively. To fit the EIS spectra, an equivalent circuit model was used that contained an inductor (L), ohmic resistance ($R_o$), two RQ elements that modeled $P_1$ and $P_2$, and a Randles circuit shown in panel a of FIG. 11 that modeled $P_3$ and Li-ion solid-state diffusion.

According to the results listed in Table 4, the NMC-GrEC electrode shows lower charge transfer impedance ($R_3$ of 85Ω) than the NMC-CBPVDF electrode ($R_3$ of 118Ω) before cycling. This result is consistent with expectations gleaned from the NMC-GrEC electrode microstructure. Since the NMC particles are conformally coated with a percolating carbon network possessing intrinsically high electronic conductivity (~$10^4$ S/m), electrons and holes can be immediately supplied to charge compensate near sites where lithium (de)intercalation occurs. This mechanism enables efficient charge transfer across the surfaces of the active material particles. In contrast, carbon black particles possess lower intrinsic electrical conductivities and act as point contacts between active material particles, thereby permitting only localized charge transfer.

gests that it could be related to degradation mechanisms at high voltages, such as chemomechanical changes in the active material or the formation of a thick chemical interphase. Correspondingly, another RQ element was added to the equivalent circuit model and used to fit the high-voltage EIS data after cycling, as shown in panel b of FIG. 11.

According to the fit results (Table 4), the charge transfer impedance ($R_3$) for both electrodes increased after 50 cycles. This increase was greater for the NMC-CBPVDF electrode (180Ω, corresponding to a 153% increase) compared to the NMC-GrEC electrode (120Ω, corresponding to a 141% increase). Moreover, the magnitude of the surface film impedance ($P_4$) at low frequencies was significantly higher in the NMC-CBPVDF (18500Ω) electrode compared to the NMC-GrEC electrode (6850Ω). These EIS results, coupled

TABLE 4

Results of the EIS spectra fitting of the NMC-CBPVDF and NMC-GrEC half cells vs. Li metal before cycling, after cycling between 2.0 V and 4.3 V vs. Li/Li$^+$, and after cycling between 2.0 V and 4.8 V vs. Li/Li$^+$.

| | | Electrode/ Current Collector ($P_1$) | | Lithium Metal/ Electrolyte ($P_2$) | | Electrode/ electrolyte charge transfer ($P_3$) | | High-Voltage ($P_4$) | | |
|---|---|---|---|---|---|---|---|---|---|---|
| | | $R_1$ (Ω) | $C_1$ (μF cm$^{-2}$) | $R_2$ (Ω) | $C_2$ (μF cm$^{-2}$) | $R_3$ (Ω) | $C_3$ (mF cm$^{-2}$) | $R_4$ (Ω) | $C_4$ (mF cm$^{-2}$) | D (cm$^2$ S$^{-1}$) |
| Before cycling | NMC-CBPVDF | 3 | 0.46 | 370 | 1.97 | 118 | 0.11 | — | — | 1.09 × 10$^{-7}$ |
| | NMC-GrEC | 2.5 | 0.56 | 200 | 1.78 | 85 | 0.22 | — | — | 1.24 × 10$^{-7}$ |
| After 50 cycles (4.3 V) | NMC-CBPVDF | 2.9 | 0.47 | 36 | 2.8 | 1290 | 0.79 | — | — | |
| | NMC-GrEC | 2.2 | 0.51 | 11 | 2 | 595 | 0.88 | — | — | 2.00 × 10$^{-10}$ |
| After 50 cycles (4.8 V) | NMC-CBPVDF | 2 | 0.79 | 31 | 0.62 | 180 | 3.55 | 18500 | 1.13 | 4.00 × 10$^{-10}$ |
| | NMC-GrEC | 2 | 0.71 | 24 | 0.98 | 120 | 1.71 | 6850 | 1.64 | 2.2 × 10$^{-10}$ |

Figure 2:
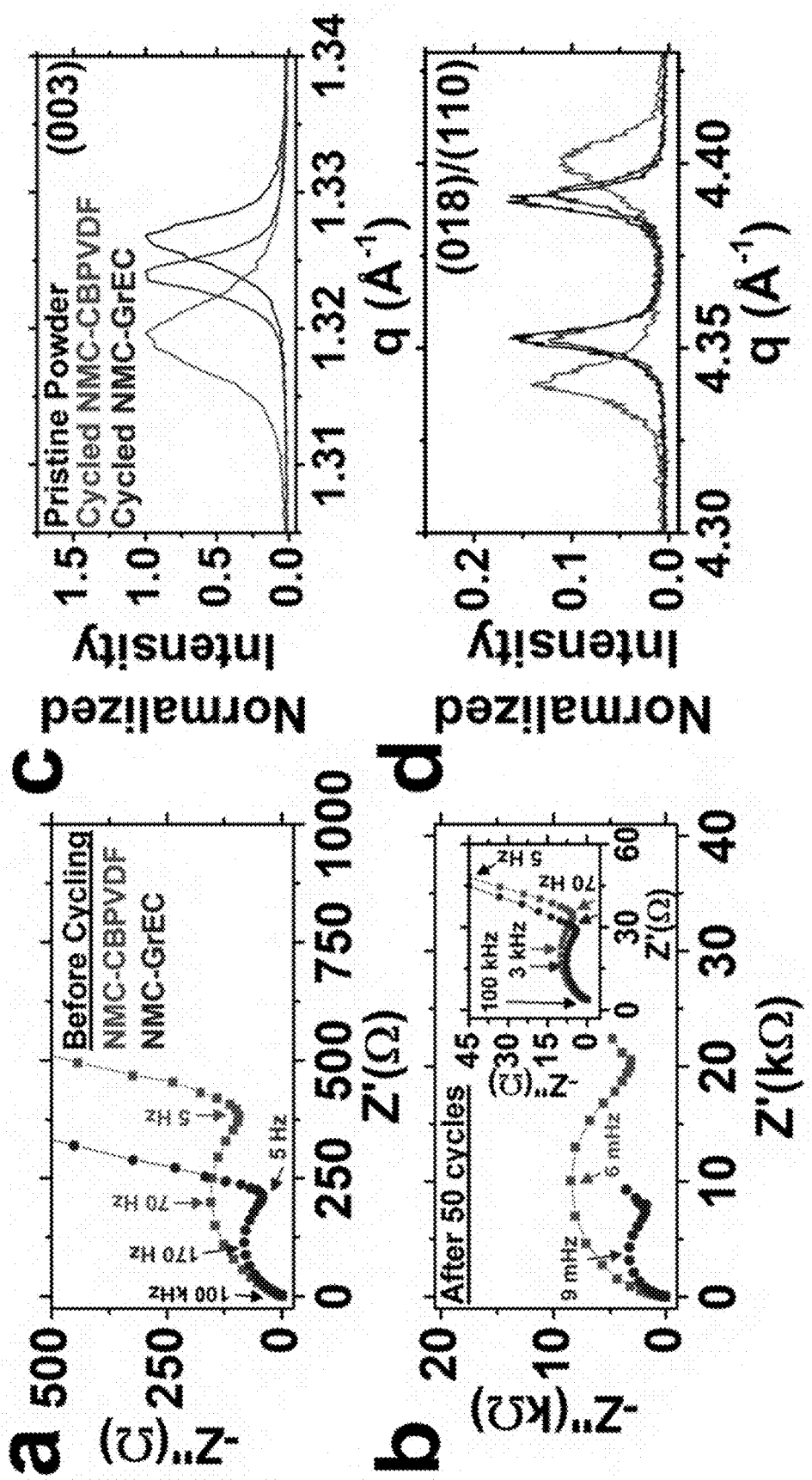
FIG. 2 shows additional confirmation of material degradation after cycling according to embodiments of the invention. Panels a-b: Nyquist plots obtained via electrochemical impedance spectroscopy before cycling (panel a) and after 50 cycles (panel b). Panel a and the inset of panel b show zoomed-in views of the high-frequency responses. Panels c-d: High-resolution powder X-Ray diffraction patterns near the vicinities of the (003) peak (panel c) and (018)/(110) peaks (panel d) for the pristine NMC powder and for samples that were cycled 50 times.
Figure 10:
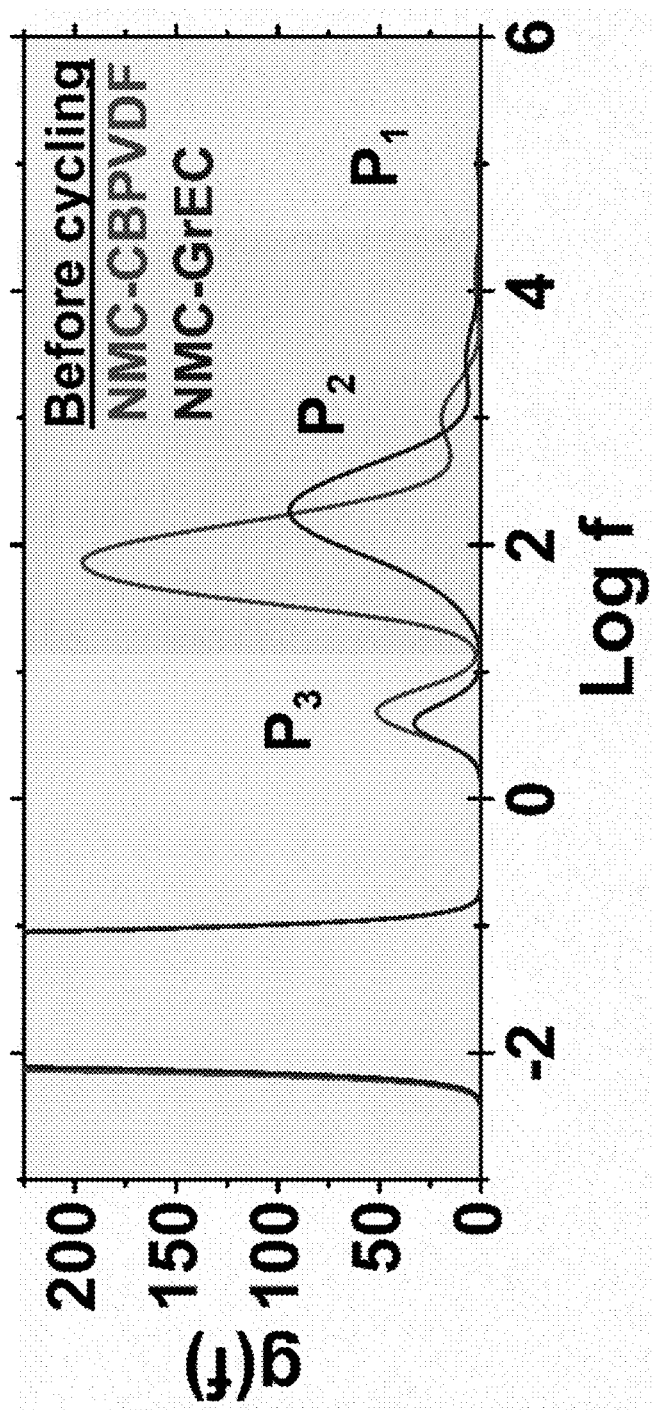
FIG. 10 shows DRT spectra for the NMC-CBPVDF and the NMC-GrEC electrodes acquired before cycling according to embodiments of the invention.
Figure 11:
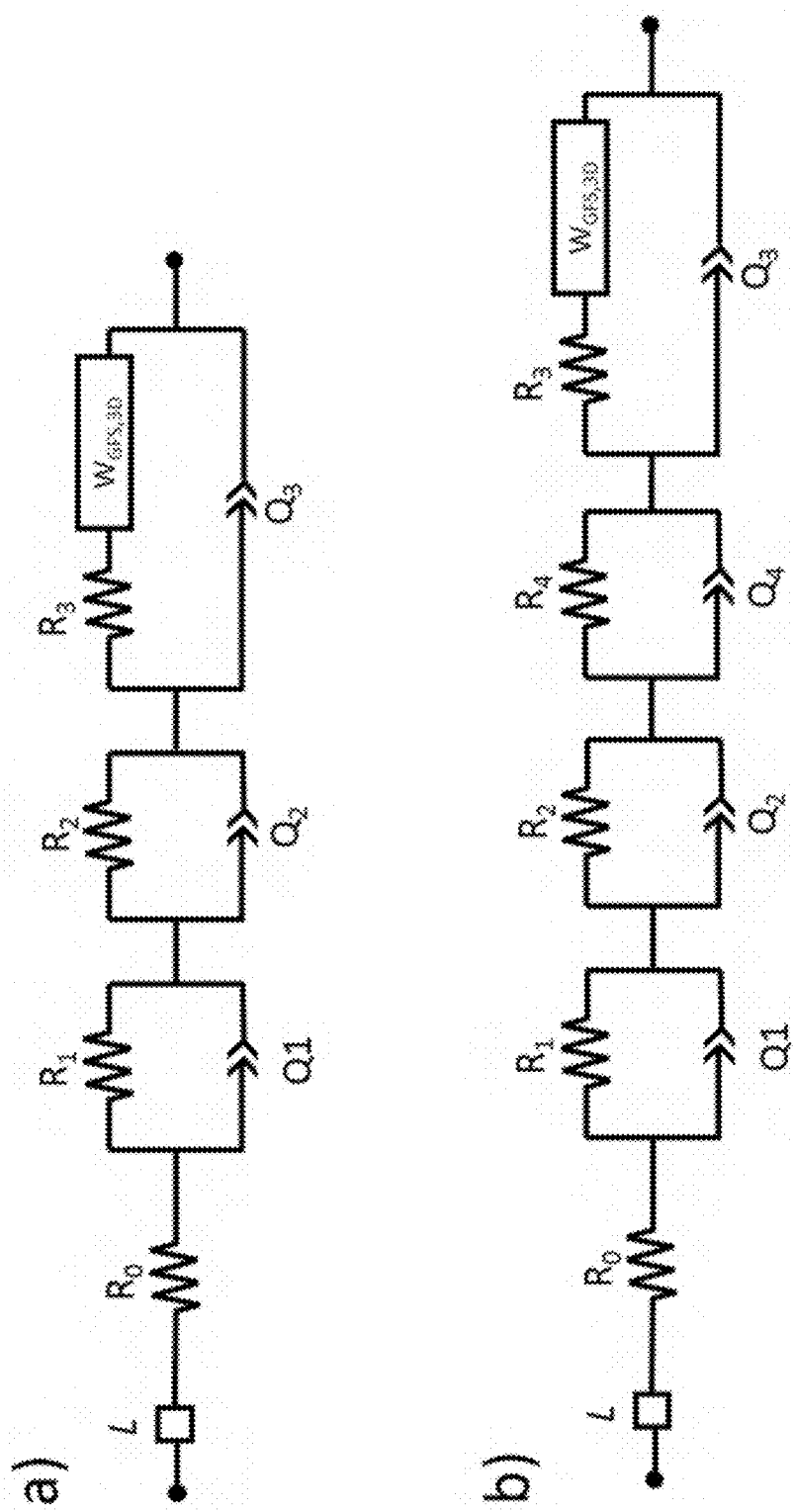
FIG. 11 shows the equivalent circuit models used to fit the EIS spectra for the NMC-CBPVDF and NMC-GrEC cells cycled versus Li metal (panel a) before cycling and (panel b) after cycling between 2.0 V and 4.8 V vs. Li/Li$^+$, according to embodiments of the invention.
Figure 12:
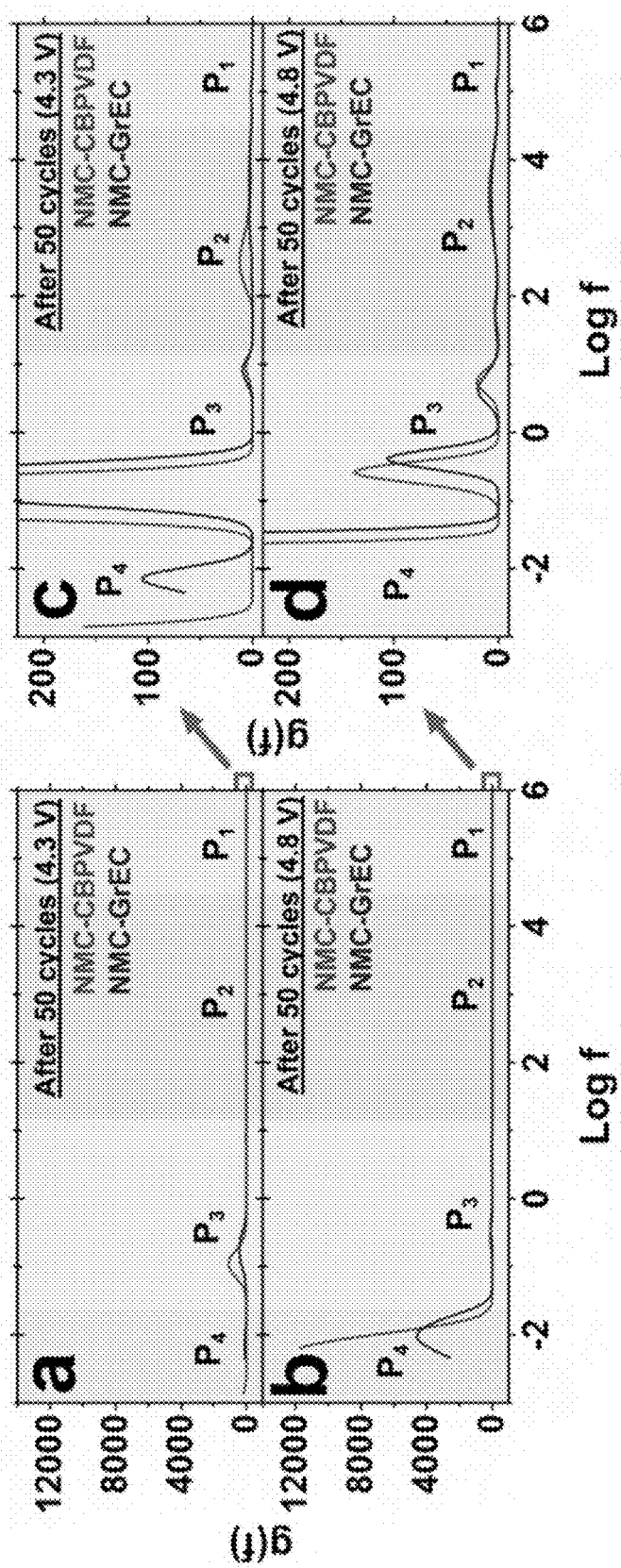
FIG. 12 shows DRT spectra from NMC-CBPVDF and NMC-GrEC electrodes after 50 cycles (panel a, panel c) between 2.0 V and 4.3 V vs. Li/Li$^+$ and (panel b, panel d) between 2.0 V and 4.8 V vs. Li/Li$^+$, according to embodiments of the invention. Panels c-d are zoomed-in regions of panels a-b to better show processes $P_1$, $P_2$, and $P_3$, which correspond to the electrode-current collector interface ($P_1$), Li metal-electrolyte interface ($P_2$) and electrode-electrolyte interface ($P_3$) processes, respectively. The gray region shows Li diffusion and high-voltage degradation processes ($P_4$).
Figure 13:
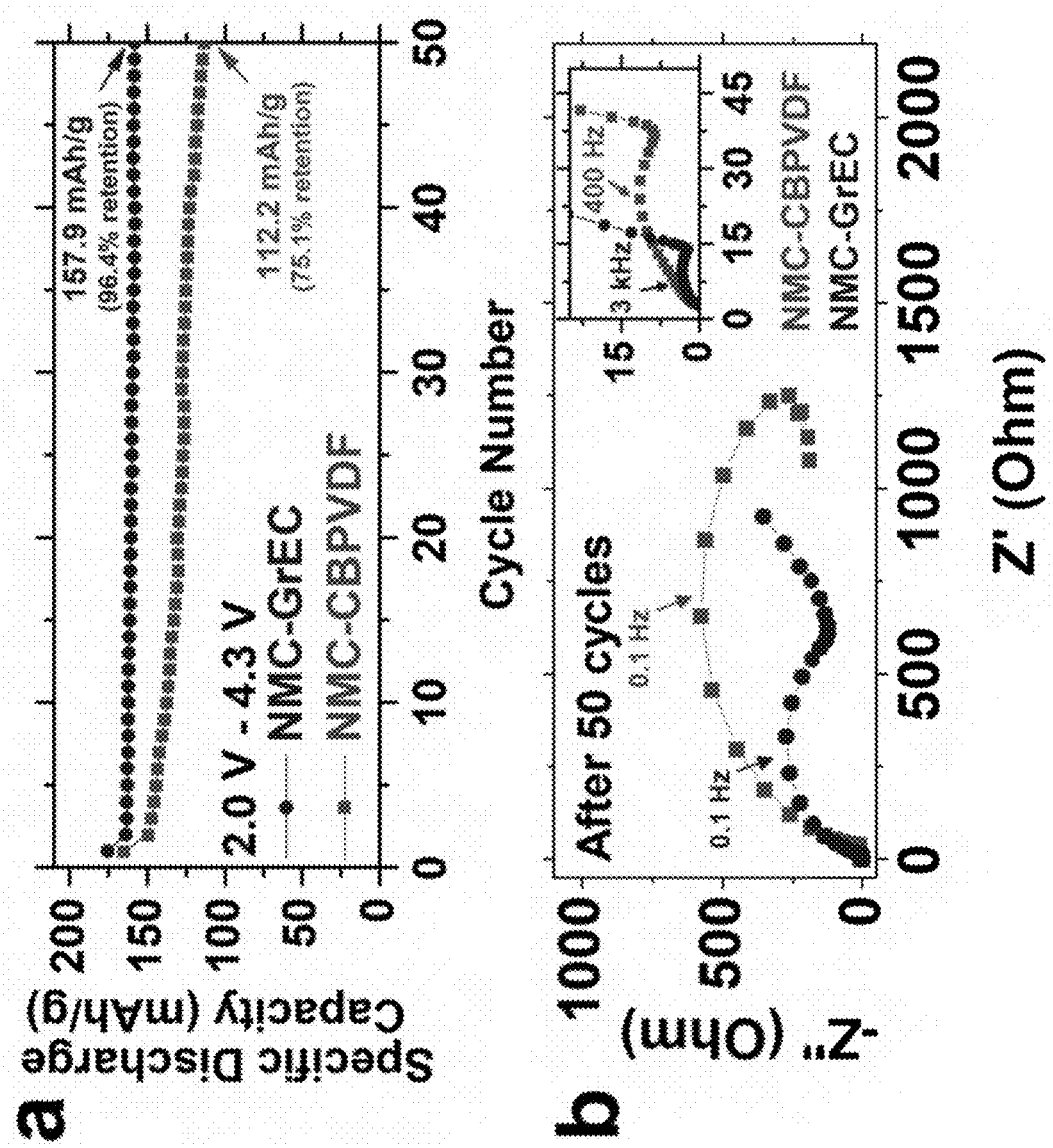
FIG. 13 shows EIS data for the NMC-CBPVDF and NMC-GrEC electrodes cycled to 4.3 V vs. Li/Li$^+$, according to embodiments of the invention. Panel a: Galvanostatic cycling results. Panel b: Nyquist plot acquired after 50 cycles. Inset shows a zoomed-in view of the high-frequency response. To process the data for DRT and equivalent circuit modeling, the low-frequency data for the NMC-CBPVDF electrode were truncated after 20 mHz.

After 50 cycles, the Nyquist plots for both electrodes each contain two semicircles and a diffusion line, as shown in panel b of FIG. 2. The DRT analysis for the samples after 50 cycles suggests that the first semicircle in the Nyquist plot (panel b of FIG. 2, inset) was composed of impedances associated with the electrode-current collector ($P_1$) and lithium metal-electrolyte ($P_2$) interfaces. The charge transfer at the electrode-electrolyte interface ($P_3$), which occurs at medium frequencies, increases and shifts to lower frequencies with cycling, as shown in FIG. 10 and panel b of FIG. 12. The DRT analysis implies that the $P_3$ process comprises only a small portion of the large semicircle in the Nyquist plot of the cells after 50 cycles, as shown in panel b of FIG. 2. The remainder of the second semicircle corresponds to a fourth process at lower frequencies ($P_4$ at ~9 mHz) and was assigned to degradation processes at high voltage. Importantly, this conclusion was corroborated by additional DRT tests performed on replicate NMC-CBPVDF and NMC-GrEC electrodes cycled between 2.0 V and 4.3 V vs. Li/Li' at the same applied current rate, as shown in panel a and panel c of FIG. 12 and panels a-b of FIG. 13. The DRT response of these replicate cells showed a $P_4$ process with a negligible magnitude when compared to the DRT response of the cells cycled at high voltage, providing strong evidence for a relationship between the cutoff voltage and the magnitude of the $P_4$ polarization, as shown in panels a-d of FIG. 12. The voltage-dependent activation of this process sugwith the galvanostatic cycling data, suggest that active material degradation accumulated in a manner that increased the electrode charge transfer impedance. However, since these impedance values are lower for the NMC-GrEC electrode, the graphene coating apparently mitigates NMC degradation and ensures a more efficient charge-discharge process. Finally, the improved electrochemical performance of the NMC-GrEC electrode was likely related to the significantly lower $R_4$ impedance associated with high-voltage degradation.

EIS and DRT Analysis—4.3V: Based on the DRT results, as shown in panels a and c of FIG. 12, the small semicircle at the beginning of the Nyquist plot in panel b of FIG. 13 contains $P_1$ and $P_2$, which originate from the electrode-current collector interface and the lithium metal-electrolyte interface, respectively. The third process, representing charge transfer at the electrode-electrolyte interface ($P_3$), occurs at medium frequencies and shifts to lower frequencies with cycling, as shown in panel a and panel c of FIG. 12. In the EIS spectra obtained after cycling between 2.0 V and 4.3 V vs. Li/Li$^+$, as shown in panel b of FIG. 13, the second semicircle is mainly composed of the $P_3$ (~0.1 Hz). Importantly, although the $P_4$ process is present in the DRT response for the samples cycled to 4.3 V vs. Li/Li$^+$, it is much lower in magnitude than for samples cycled to 4.8 V vs. Li/Li$^+$, suggesting that this process is tied to high-voltage operation.

Postmortem Characterization

High-Resolution X-Ray Diffraction: The severe increases in polarization and impedance as well as the lower coulombic efficiency for the NMC-CBPVDF electrode suggest that the amount of reversible lithium significantly decreases over 50 cycles. To probe structural changes related to the SOC, high-resolution SR-PXRD was performed on fully discharged samples from the two electrodes. Since the NMC unit cell dimensions are highly dependent on the SOC, discharging the electrodes to the same voltage and then measuring the (110) and the (003) peak positions can elucidate differences between the lithium contents of the two samples. As NMC is charged to moderate SOCs, lithium is removed from the NMC structure, causing the unit cell to contract in the a=b directions and expand in the c direction since unoccupied sites in the lithium layer promote oxygen-oxygen repulsion across the resulting van der Waals gap. This phenomenon is evident in the diffraction pattern as the (110) peak shifts to higher angles while the (003) peak shifts to lower angles. Although these peaks are expected to return to their original positions during discharge, the diffraction patterns show that the (110) and the (003) peaks in the cycled samples deviated from their pristine positions despite having been discharged to the same nominal voltage, as shown in panels c-d of FIG. 2. Larger deviations suggest the existence of a larger population of NMC possessing lower lithium content than expected. This result can be attributed to various degradation mechanisms, including the formation of interfacial electrolyte decomposition products that kinetically limit charge transfer reactions, surface rocksalt phases that inhibit electrochemical activity, and cycling-induced volumetric changes that cause cracking, particle fracture, or detachment from the conductive path to the current collector. In particular, at higher SOCs, more severe mechanical degradation is expected due to a collapse of the c lattice parameter of the NMC unit cell. Therefore, the SR-PXRD results corroborate the galvanostatic cycling and EIS results, and suggest that the graphene-coated electrode experienced reduced material degradation compared to the control sample.

Figure 3:
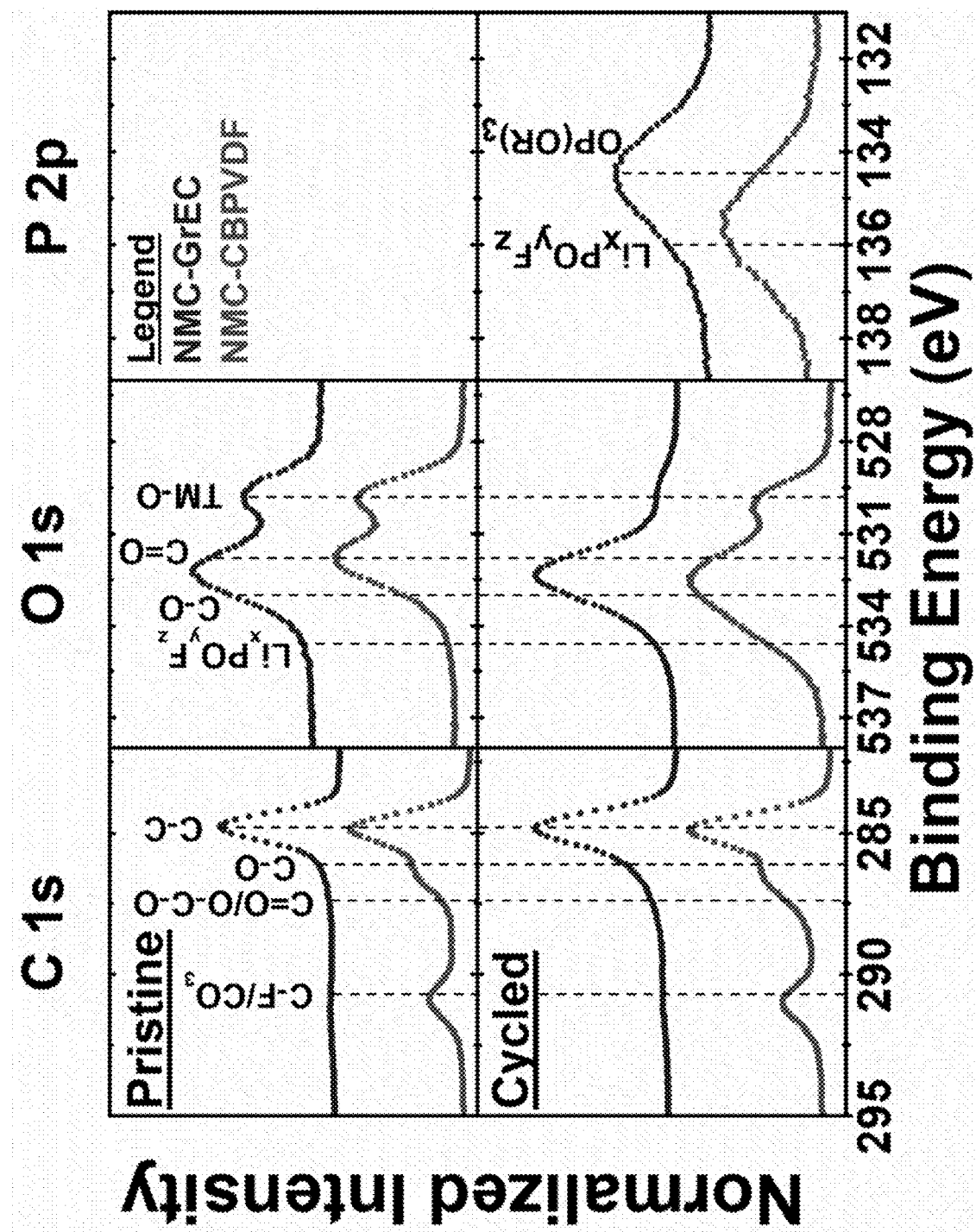
FIG. 3 shows XPS C 1s, O 1s, and P 2p spectra of the NMC-GrEC and NMC-CBPVDF electrodes before cycling (top) and after cycling (bottom) according to embodiments of the invention. The P 2p spectra for the pristine samples were not taken since the phosphorous character will only be present after electrolyte contact.

X-Ray Photoelectron Spectroscopy: Since the enhanced cycling behavior and the postmortem SR-PXRD results suggested that less active material degradation occurred for the NMC-GrEC electrode, additional characterization was performed to corroborate and refine this conclusion. Specifically, XPS was used to investigate the differences between the surface chemistries of the two electrodes before and after cycling. The C 1s spectra for both electrodes before and after cycling show an intense peak at 284.8 eV, corresponding to C—C bonds, as shown in FIG. 3, originating from the conductive carbon additives. The NMC-CBPVDF electrode also exhibits a broad intensity shoulder between 286 eV and 287.5 eV, which matches well with reported values for C—O bonds (286.1 eV) and C=O/O—C—O bonds (287.4 eV) and likely originates from carbon-oxygen surface functional groups on carbon black particles. In contrast, the C 1s spectrum for the pristine NMC-GrEC electrode surface is dominated by C—C bonding character. This observation is consistent with previous reports indicating that the thermal decomposition of ethyl cellulose results in volatilization of carbon-oxygen compounds, thereby leaving behind a graphitic carbon residue that facilitates charge transport through the percolating network of graphene flakes. At higher binding energies, low-intensity shake-up features (~291 eV) are also present in the GrEC system. The difference in the C—F bond intensities near 290.7 eV is attributed to the absence of polyvinylidene fluoride binder in the NMC-GrEC electrode.

Figure 14:
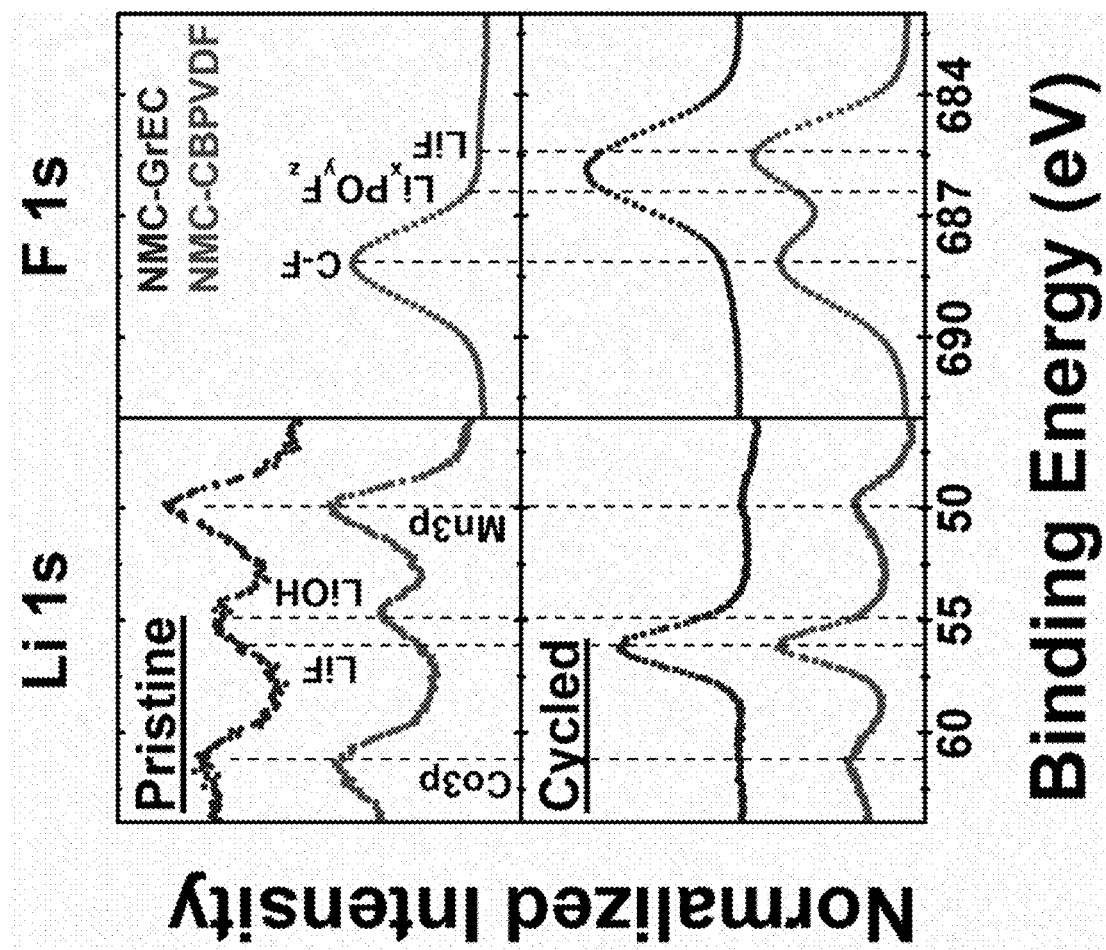
FIG. 14 shows XPS Li 1s and F 1s spectra of the NMC-GrEC and NMC-CBPVDF electrodes before cycling (top) and after cycling (bottom) according to embodiments of the invention.

Following electrochemical cycling, increased spectral intensities are present at binding energies corresponding to C—O and C=O/O—C—O bonds for both electrodes, likely due to the formation of interfacial organic decomposition products. This conclusion is corroborated by the O 1s spectra (FIG. 3), which both show transition metal-oxygen peaks at 529.1 eV and carbon-oxygen bonding character as evidenced by the spectral intensities near 531.8 eV (C=O bonds) and 533.2 eV (C—O bonds). After 50 cycles, the transition metal-oxygen intensity decreases relative to the carbon-oxygen bond intensities. Similarly, the Mn 3p and the Co 3p peaks are initially prominent in the Li 1s XPS spectra for both pristine samples, but significantly decrease in intensity after cycling, as shown in FIG. 14. This behavior also suggests that an organic-rich SEI layer formed during cycling that attenuated the transition metal-oxygen signal from the NMC bulk, as shown in FIG. 3, which is consistent with the galvanostatic cycling and the EIS results. While carbon black is known to react with electrolyte components to form organic decomposition products, the absence of out-of-plane dangling bonds on graphene likely minimizes its chemical reactivity with the electrolyte. Indeed, the C 1s spectrum for the NMC-GrEC electrode after cycling is still dominated by the C—C spectral intensities, suggesting that the graphene coating successfully maintains a highly conductive surface over the operating lifetime of the cell, which ensures efficient charge transfer, reduces electrode polarization, lowers impedance, and enables superlative electrochemical performance.

Interestingly, the chemical nature of the inorganic degradation products differ between the two cycled electrodes, as shown in FIG. 3. The Li 1s and the F 1s spectra (FIG. 14) suggest that LiF (56.1 eV and 685.4 eV) is present in both cycled samples, which has been previously reported as a $LiPF_6$ salt decomposition product. Additional degradation reactions involving the lithium salt are known to form phosphate compounds, which can subsequently react with lattice lithium to form $Li_xPO_yF_z$ species. Significantly, the P 2p spectrum (FIG. 3) for the cycled NMC-CBPVDF electrode shows prominent spectral intensities at binding energies close to reported values for $Li_xPO_yF_z$ (136.0 eV), whereas the NMC-GrEC electrode exhibits greater intensities close to the binding energies reported for phosphates (134.5 eV). These results imply that fewer fluorophosphate degradation products were present on the NMC-GrEC electrode, which was presumably due to the presence of the interfacial graphene layer. Since the graphene coating prevents direct electrode-electrolyte contact, it reduces interactions between charged oxide surfaces and electrolyte solvent molecules, kinetically suppressing dissociation reactions such as ethylene carbonate dehydrogenation. Such reactions produce surface protic species, which can subsequently attack $LiPF_6$ to form HF and fluorophosphates. The latter compound can then react with lattice lithium to form $Li_xPO_yF_z$ degradation products, which parasitically reduces the available lithium inventory, leading to capacity fade and lower coulombic efficiencies. Moreover, this reaction pathway also suggests that the graphene coating could slow the electrochemical formation of HF, providing an additional mechanism for cycle life improvement.

Figure 15:
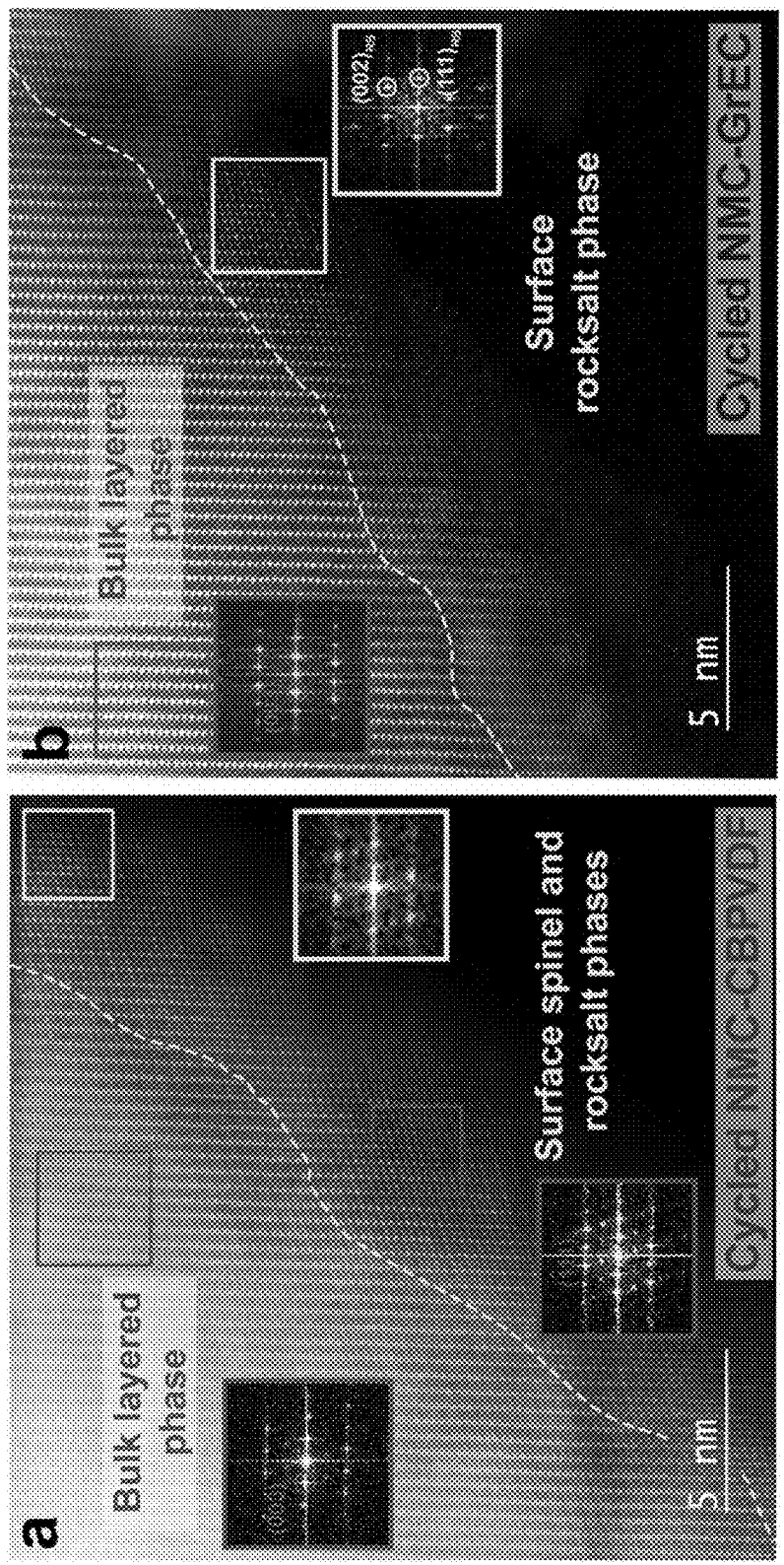
FIG. 15 shows postmortem STEM analysis of NMC-CBPVDF electrode (panel a) and NMC-GrEC electrode (panel b) after 50 cycles between 2.0 V and 4.8 V vs. Li/Li$^+$ at 0.5 C, according to embodiments of the invention. The inset FFT patterns show the presence of layered (green, or L), spinel (red, or S), and rocksalt (yellow, or RS) phases. The zone axis is [1-10].

Scanning Transmission Electron Microscopy: Surface structural changes due to electrochemical cycling were also characterized with scanning transmission electron microscopy. NMC is known to experience surface phase transformations at the electrode-electrolyte interface during extended cycling, where the bulk layered structure changes to spinel and rocksalt phases due to the accumulation of Li—Ni antisite defects. The extent of these structural reconstructions is linked to the surface chemical environment, which includes interactions between the oxide surface and the electrolyte. Since the XPS analysis suggested that the graphene coating suppressed these chemical interactions, the relationship between the presence of the graphene-EC coating and surface phase transformation was investigated using high-angle annular dark-field scanning transmission electron microscopy (HAADF-STEM), as shown in panels a-b of FIG. 15. In the interior of the NMC particle, regions with bright and dark contrast correspond to regions with high and low atomic numbers, respectively. This observation is consistent with a R-3m layered structure containing alternating transition metal and lithium layers along the c direction. Near the particle edge, transition metals were observed in the lithium layer, which is consistent with the presence of Li—Ni antisite defects. Fast Fourier transform (FFT) analysis was used to identify layered (L), spinel (S), and rocksalt (RS) phases, as shown in insets in panels a-b of FIG. 15. The FFT analysis showed spots indexed to the $(003)_L$ planes in the layered phase, the $(111)_{RS}$ and the $(002)_{RS}$ planes in the rocksalt phase, and the $(111)_S$ planes in the spinel phase. All three phases were found in the NMC-CBPVDF electrode (consistent with the findings of Jung et al.), whereas the spinel phase was not observed in the NMC-GrEC sample. Previous reports also found rocksalt surface reconstructions for NMC and posited that the spinel phase serves as a bridge between the bulk layered phase and the final rocksalt phase. Using the HAADF-STEM images, the thicknesses of the surface reconstruction layers on the NMC-CBPVDF and the NMC-GrEC samples were both found to be approximately 5 nm. The similarity between these thickness measurements suggested that the graphene coating did not significantly impact the formation of new phases near the particle surface.

Inductively Coupled Plasma Mass Spectrometry: Since earlier reports on NMC concluded that dangling bonds on surface phases are susceptible to transition metal dissolution into the electrolyte, this possibility was probed via inductively coupled plasma-mass spectroscopy (ICP-MS). In prior work, graphene was used to prevent the dissolution of Mn into carbonate-based electrolytes since its basal plane presents a high diffusion barrier to Mn ions. A conformal graphene-EC coating could therefore provide similar benefits for the NMC system. However, analysis of the transition metal dissolution behavior in the pristine electrodes (Table 5) showed no significant differences between the NMC-GrEC and the NMC-CBPVDF electrodes. Although the transition metal concentrations between the two samples varied by approximately ±10%, the measured amount was low (<1 ppm of dissolved transition metal per milligram of active material), suggesting that NMC was not particularly susceptible to transition metal dissolution. This conclusion is consistent with prior reports of NMC.

TABLE 5

Concentrations of dissolved transition metal ions for the NMC-CBPVDF control electrode and the NMC-GrEC electrode as determined by ICP-MS.

| Sample | Concentration (ppb/mg active material) | | |
|---|---|---|---|
| | Ni | Mn | Co |
| NMC-CBPVDF | 320.62 | 677.31 | 68.86 |
| NMC-GrEC | 314.76 | 615.27 | 71.33 |

Figure 4:
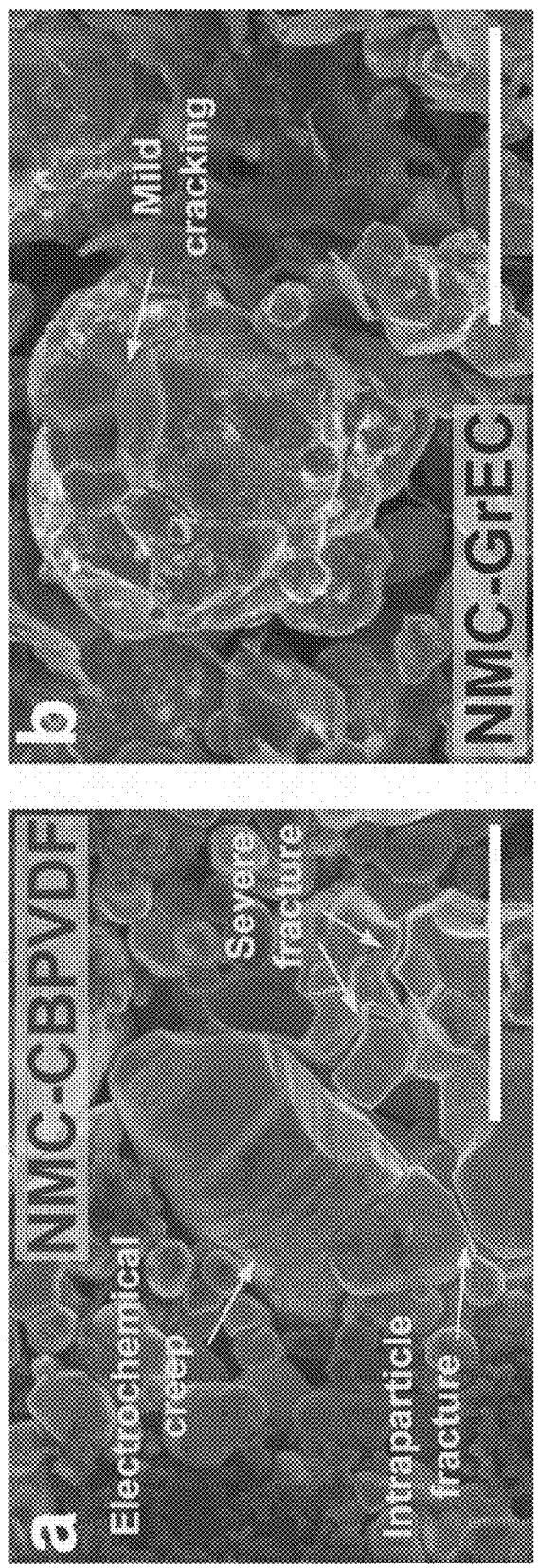
FIG. 4 shows postmortem scanning electron microscopy images of the NMC-CBPVDF electrode surface (panel a) and NMC-GrEC electrode surface (panel b), according to embodiments of the invention. Both scale bars are 2 μm.
Figure 16:
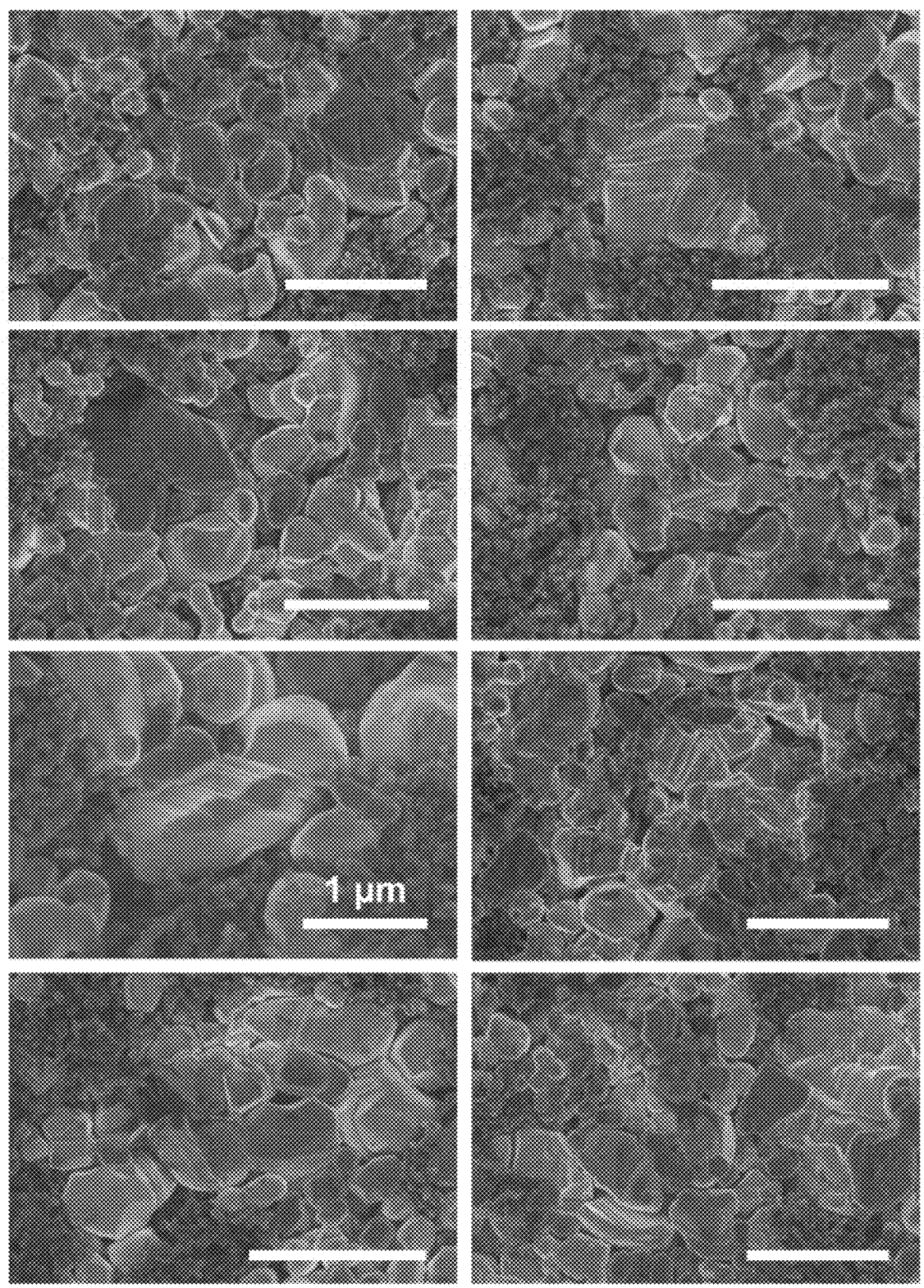
FIG. 16 shows additional postmortem SEM images showing intraparticle and interparticle fracture and electrochemical creep in the NMC-CBPVDF electrode, according to embodiments of the invention. Unless noted, all scale bars are 2 μm.
Figure 17:
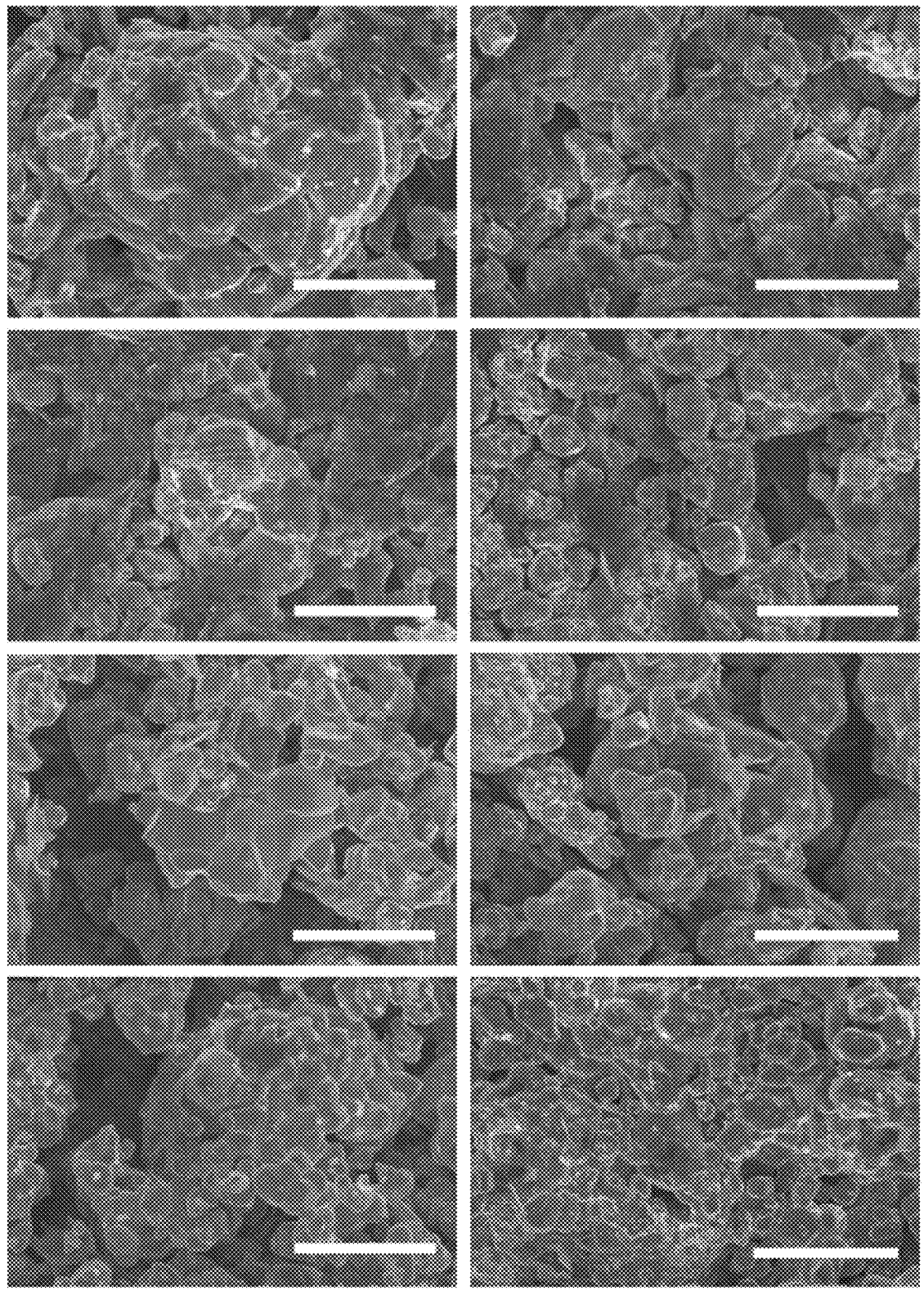
FIG. 17 shows additional postmortem SEM images showing limited evidence of intraparticle and interparticle fracture and electrochemical creep in the NMC-GrEC electrode, according to embodiments of the invention. All scale bars are 2 μm.

Scanning Electron Microscopy: Finally, postmortem SEM was performed on the cycled electrodes to investigate morphological changes that occurred during cycling. Three modes of mechanical degradation were found. First, interparticle cracking was observed, as shown in FIG. 4, which likely originated from anisotropic changes in the unit cell volume at high SOCs or spatially non-uniform charge transfer reactions between particles, both of which would generate strain energy that could drive particle fracture. Second, intraparticle cracking was observed in primary particles. Both intraparticle and interparticle cracking can lead to electrically isolated active material fragments that no longer contribute to the overall capacity. The NMC-CBPVDF electrode showed significant signs of both failure modes, with wide gaps forming between individual primary particles, as shown in panel a of FIG. 4 and FIG. 16. In contrast, fewer and thinner intraparticle and interparticle cracks were found on the NMC-GrEC electrode, as shown in panel b of FIG. 4 and FIG. 17. Third, electrochemical creep was observed, as evidenced by the macroscopic shearing of the primary particles (FIGS. 4 and 16). According to Radin et al., this phenomenon is consistent with the O3 to O1 phase transformations reported for other layered lithium transition metal oxides possessing R-3m symmetry. As the lithium content decreases with increasing SOC, the energy barrier inhibiting transition metal layer slab sliding is lowered, resulting in the O3 to O1 phase transformation. Over many cycles, the accumulation of these local changes in oxygen stacking can drive lattice-invariant shear. The result is the formation of terraced surfaces that are evident on particles in the NMC-CBPVDF electrode. This phenomenon is consistent with the predictions made by Radin et al., as well as reports for other layered oxides such as $LiCoO_2$, $LiNiO_2$, and NMC. Furthermore, the accumulation of defects due to electrochemical creep can induce broad changes in the particle shape or act as nucleation sites for additional cracking, which implies that the mechanisms underlying the various mechanical failure modes are likely related. Significantly, the severity of electrochemical creep was much lower in the NMC-GrEC electrode, as shown in panel b of FIG. 4 and FIG. 17, as evidenced by reduced terracing. To confirm that this observation was consistent across different areas on the electrodes, an extensive analysis of over 2,000 primary particles on each of the two electrodes was conducted via SEM to identify signs of electrochemical creep. Approximately 18% of the primary particles evaluated for the NMC-CBPVDF electrode showed terracing, compared to only ~6% of the primary particles evaluated for the NMC-GrEC electrode.

Figure 18:
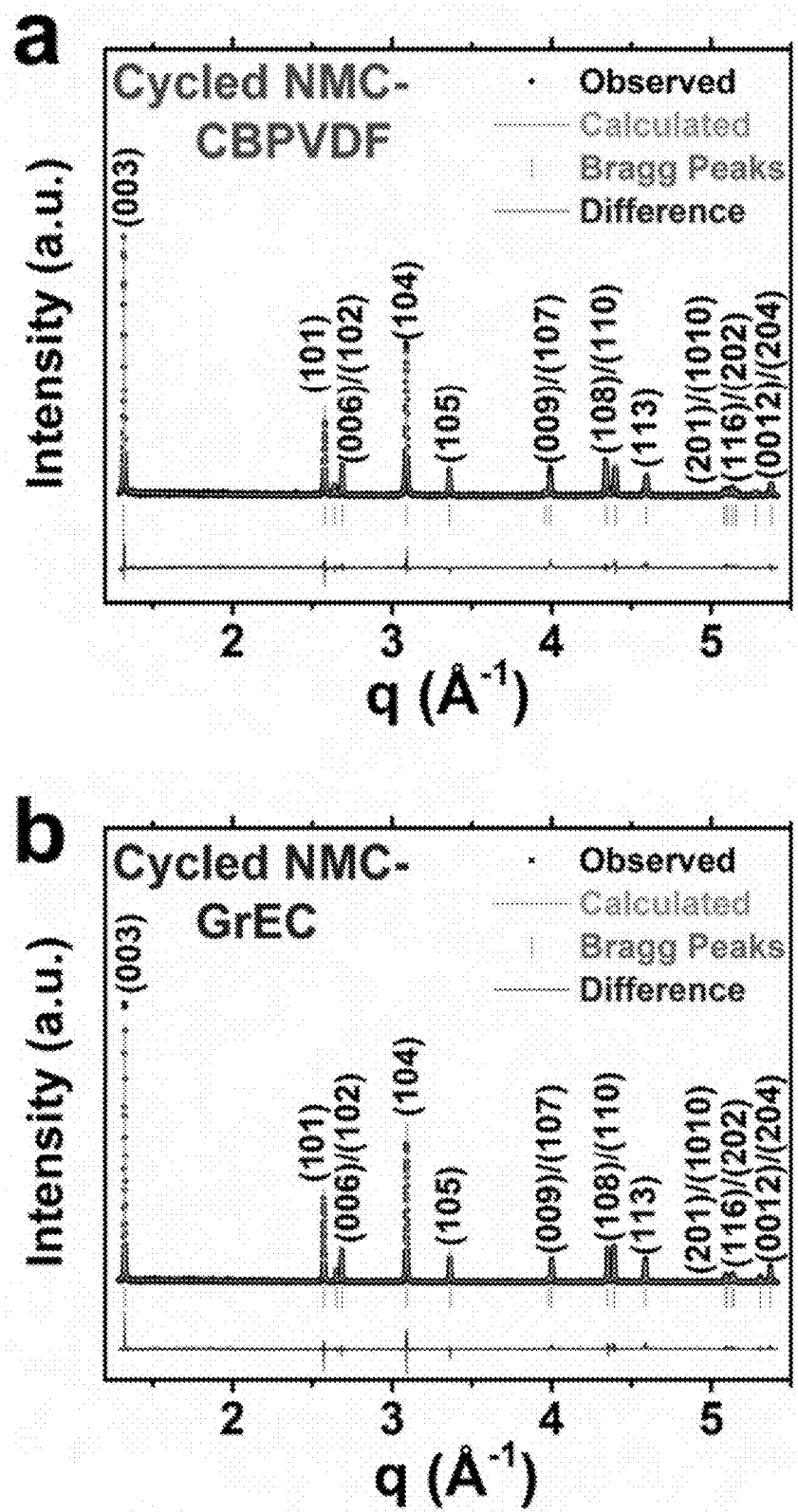
FIG. 18 shows postmortem synchrotron radiation powder X-Ray diffraction patterns of the NMC-CBPVDF electrode (panel a) and NMC-GrEC electrode (panel b), according to embodiments of the invention.

Furthermore, evidence of changes in the particle morphology was correlated to differences between the SR-PXRD patterns of the pristine and cycled samples. The increases in the (110) and the (003) full-width half maxima, as shown in panels c-d of FIG. 2, suggested that the domain sizes and the microstrain amounts evolved differently between the two samples, which was consistent with the macroscopic mechanical deformation observed in SEM. Rietveld refinement of the SR-PXRD patterns for the cycled samples revealed that the domain size decreased and the microstrain increased for the NMC-CBPVDF sample after cycling. In contrast, no significant changes were found between the NMC-GrEC sample and the pristine NMC powder, as shown in FIG. 18 and Table 1.

Discussion

The observed electrochemical performance enhancement in the NMC-GrEC electrodes is likely related to the improved lithiation dynamics enabled by a conformal carbon coating. Prior work has shown that significant compositional heterogeneity exists across active material particle surfaces during cycling. In secondary particle-based electrodes, reaction non-uniformity is related to the contact between adjacent primary particles, which can change as a result of cycling-induced anisotropic strains, as well as the electrolyte penetration into the interior of the agglomerate. For primary particles, other factors can also contribute to reaction non-uniformity, such as crystallographically anisotropic lithium diffusivities or the presence of high-impedance surface phases. The graphene coating demonstrated in this work is unlikely to affect these sources of compositional heterogeneity since they are inherent to the material system. However, a surface coating presents an opportunity to engineer the dynamics of interfacial charge transfer reactions in the context of electronic connectivity within the electrode, which is highly important irrespective of the particle size or composition. In this work, the use of primary particles circumvented issues of strain buildup within large secondary particle structures and ensured that all surfaces were thoroughly wetted by the electrolyte, enabling direct analysis of the importance of electronic connectivity.

Figure 5:
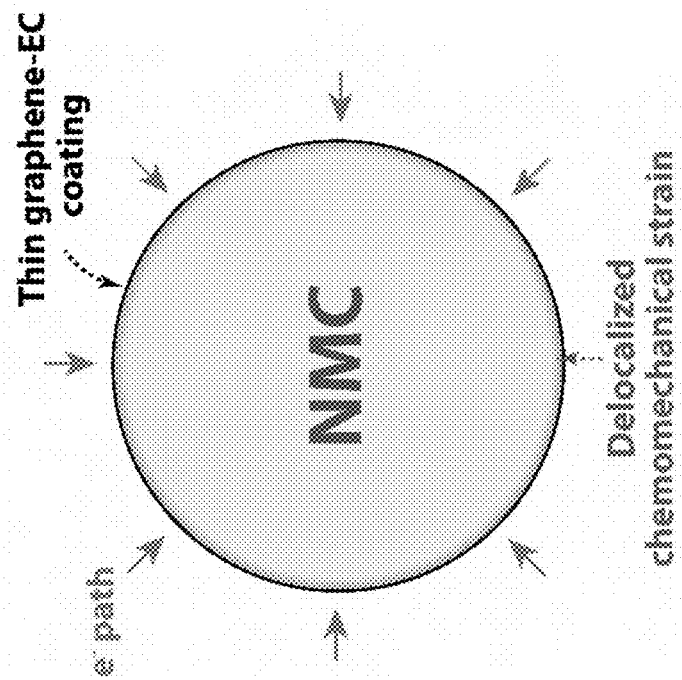
FIG. 5 shows schematic showing proposed degradation mechanisms for the NMC-CBPVDF electrode (panel a), which are mitigated in the NMC-GrEC electrode (panel b) due to the presence of the graphene coating, according to embodiments of the invention.
Figure 5:
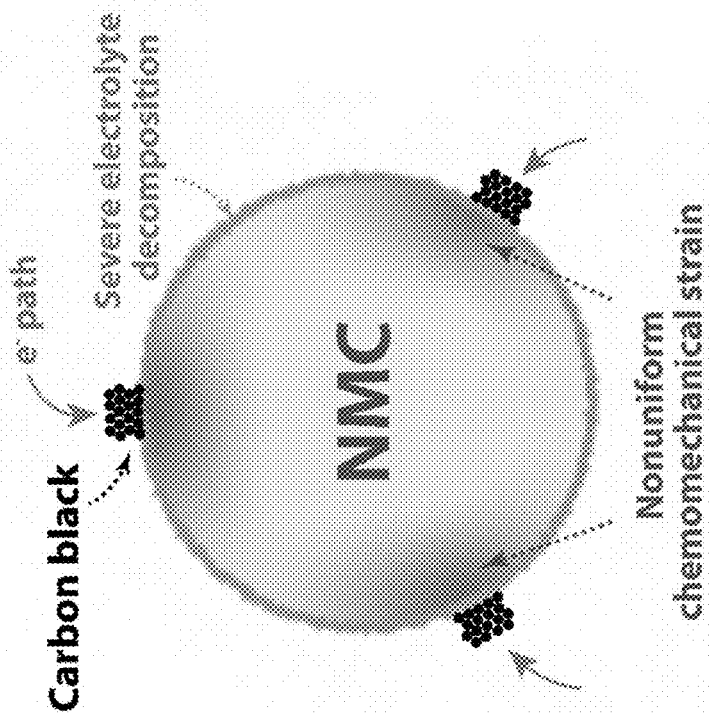

Since intercalation reactions depend on the presence of electrically conductive pathways for charge compensation, a conductive network based on non-uniformly distributed carbon black particles results in high spatial variations in electrical resistance, promoting localized hotspots with high lithium-ion current densities on the particle surface. During charging, regions neighboring these current hotspots would be delithiated first, with two impacts on mechanical degradation. First, lithium-poor and lithium-rich regions with different molar volumes would exist simultaneously within a particle, generating a corresponding stress field that varies with lithium content. Non-uniform stress and strain distributions resulting from lithiation dynamics are believed to be precursors to intraparticle and interparticle fracture. This hypothesis is corroborated by density functional theory calculations performed by Min et al., who found that layered structures that were delithiated heterogeneously possessed much lower mechanical strength than structures delithiated homogeneously. Second, highly delithiated regions could act as nucleation sites for the O3 to O1 phase transition since the barrier for transition metal layer sliding is correlated with lithium content. On the other hand, a scheme that can supply or accept electrons anywhere on the particle surface, such as a conformal graphene coating, can delocalize these hotspots, thereby promoting more spatially uniform compositional changes during cycling and mitigating mechanical degradation, as shown in FIG. 5.

A feedback loop exists between particle-level mechanical degradation and changes in interfacial chemistry, crystallography, and electrochemical activity. Cracking and lattice-invariant shear both generate new surfaces that quickly react with the electrolyte, which can lead to additional SEI or rocksalt phase formation. Effective mitigation of particle-level mechanical degradation can address these issues, therefore enabling lower electrode polarization and improved coulombic efficiency during long-term cycling. In addition, although fracture-initiated particle detachment can significantly contribute to capacity fade, this negative effect can be reduced by engineering the electronic conduction path within an electrode. Here, the conformal graphene network plays this role since it acts as a conductive network that captures particle fragments generated via intraparticle and interparticle fracture, thereby ensuring that fragments remain electrochemically active. This mechanism has been proposed to explain cycle life improvements in other systems that undergo volume expansion during lithiation, such as graphene-coated silicon microparticles.

Figure 19:
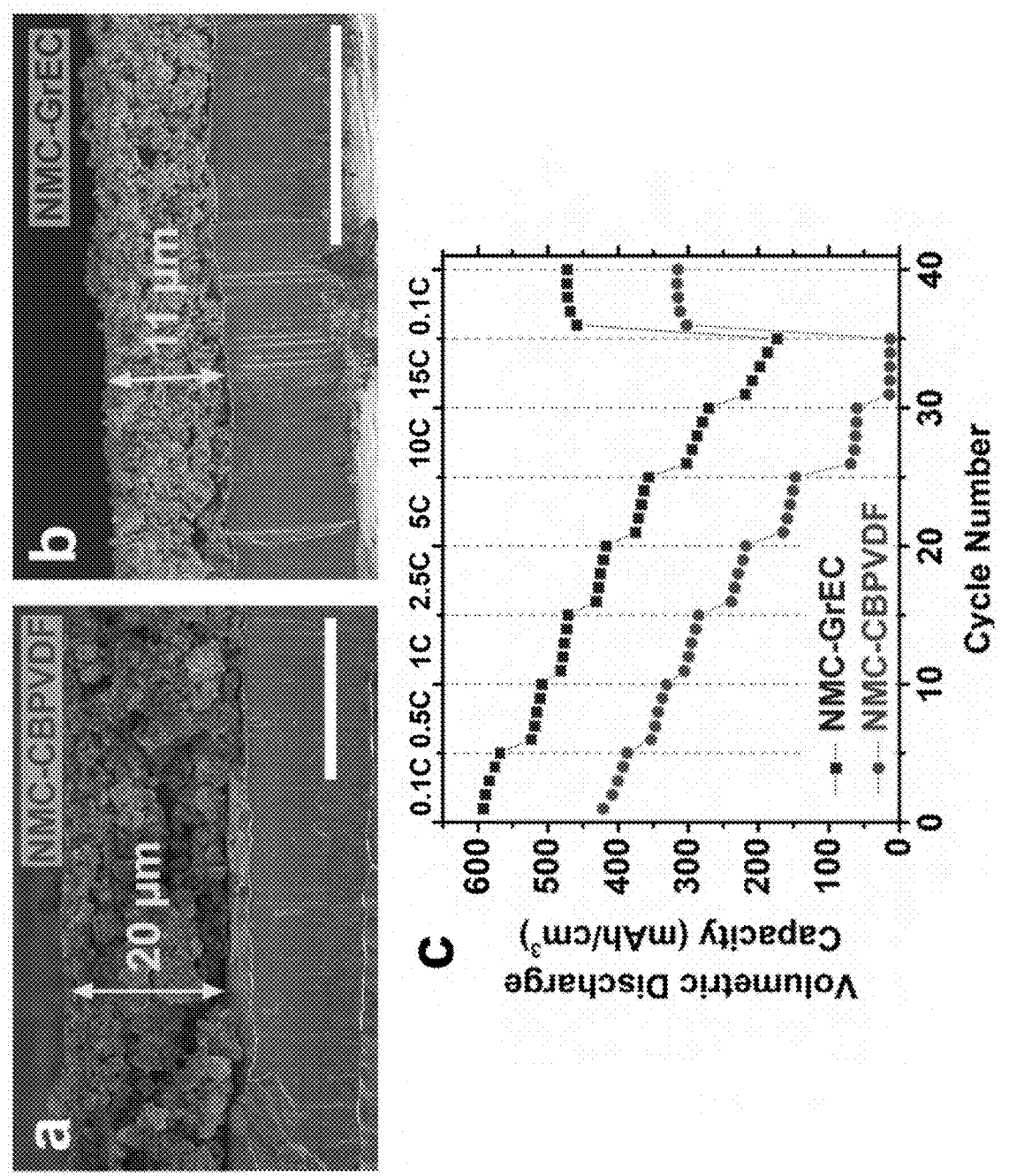
FIG. 19 shows cross-sectional SEM images of the pristine NMC-CBPVDF electrode (panel a) and the pristine NMC-GrEC electrode (panel b), showing electrode compaction effects due to the use of graphene as the conductive additive rather than carbon black. Both scale bars are 20 μm. Panel c: Volumetric rate capability for the two electrodes between 2.0 V and 4.8 V vs. Li/Li$^+$.

To be most effective, coating schemes must be able to buffer volumetric changes without cracking or fracturing themselves. For example, amorphous carbon coatings possessing weak carbon-carbon bonds are prone to mechanical failure. Similarly, inorganic coatings, which have also been employed as buffer layers between the electrode and electrolyte, introduce mechanical incompatibilities at the active material-coating interface, which can cause delamination at high SOCs. Moreover, these coatings are often oxide-based, and therefore possess inherently low electrical conductivities. Conductive carbon additives, such as carbon black, therefore become even more important for ensuring high electrochemical performance in these systems. However, these strategies do not address mechanical degradation at high operating voltages. One potential solution is to increase the fraction of conductive carbon in the electrode, but this strategy results in lower electrode energy densities and would not meet the strict performance requirements demanded by emerging electric vehicle technologies. In contrast, electrodes utilizing graphene-coated NMC have higher packing densities than electrodes fabricated with an equivalent fraction of carbon black, as shown in panels a-b of FIG. 19. The graphene coating enables a combination of a thin electrode geometry and superlative electrochemical behavior, resulting in large volumetric capacity improvements even at high applied current rates, as shown in panel c of FIG. 19. Consequently, in addition to controlling chemomechanical degradation, conformal graphene coatings present significant electrode engineering advantages. These positive impacts across multiple length scales are enabled by the intrinsically robust mechanical, chemical, and electronic properties of graphene that present distinct advantages over other surface coating schemes.

In sum, the exemplary example shows that a conformal graphene coating comprehensively enhances the high-voltage electrochemical performance of NMC cathode materials, including significantly improved cycle life, increased coulombic efficiency, and slower impedance growth. XPS analysis revealed that electrodes containing graphene-coated NMC exhibited reduced spectral intensities corresponding to lithium fluorophosphate degradation products formed during electrolyte decomposition. This observation suggests that the graphene coating acts as an interfacial buffer layer that reduced chemical interactions between the electrode and electrolyte, limiting the consumption of lithium in parasitic side reactions and improving coulombic efficiency. Postmortem electron microscopy revealed that the cycling improvements were also related to suppressed mechanical degradation, as evidenced by fewer signs of intraparticle and interparticle cracking and electrochemical creep in the graphene-coated NMC electrode. This observation was consistent with suppressed changes in the crystallite size and microstrain values obtained from Rietveld refinement following high-resolution SR-PXRD. Based on this comprehensive characterization, there exists a relationship between the spatial homogeneity of charge transfer sites and particle-level chemomechanical degradation. In this mechanism, the conformal graphene coating promotes more spatially uniform charge transfer, which delocalizes (de)lithiation-induced stress and reduces local lattice distortions that can initiate cracking and particle fracture. Suppressing the particle-level mechanical degradation of the active material also limits the generation of fresh surfaces that can parasitically form additional electrode-electrolyte interphases or surface rocksalt phases. Overall, this study highlights the importance of the relationships among interfacial coating layers, lithiation dynamics, and chemomechanical degradation of the active material, which is highly relevant for the development of systematic engineering strategies aimed at improving the performance of high-voltage LIB electrode materials.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications, and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1] W. Li, E. M. Erickson, A. Manthiram, *Nat. Energy* 2020, 5, 26.
[2] L. Giordano, P. Karayaylali, Y. Yu, Y. Katayama, F. Maglia, S. Lux, Y. Shao-Horn, *J. Phys. Chem. Lett.* 2017, 8, 3881.
[3] Y. Yu, P. Karayaylali, Y. Katayama, L. Giordano, M. Gauthier, F. Maglia, R. Jung, I. Lund, Y. Shao-Horn, *J. Phys. Chem. C* 2018, 122, 27368.
[4] G. Cherkashinin, M. Motzko, N. Schulz, T. Spath, W. Jaegermann, *Chem. Mater.* 2015, 27, 2875.
[5] S. K. Jung, H. Gwon, J. Hong, K. Y. Park, D. H. Seo, H. Kim, J. Hyun, W. Yang, K. Kang, *Adv. Energy Mater.* 2014, 4, 1300787.
[6] K. W. Nam, S. M. Bak, E. Hu, X. Yu, Y. Zhou, X. Wang, L. Wu, Y. Zhu, K. Y. Chung, X. Q. Yang, *Adv. Funct. Mater.* 2013, 23, 1047.
[7] F. Lin, I. M. Markus, D. Nordlund, T.-C. Weng, M. D. Asta, H. L. Xin, M. M. Doeff, *Nat. Commun.* 2014, 5, 3529.
[8] D. P. Abraham, R. D. Twesten, M. Balasubramanian, I. Petrov, J. McBreen, K. Amine, *Electrochem. Commun.* 2002, 4, 620.
[9] F. Lin, D. Nordlund, I. M. Markus, T. C. Weng, H. L. Xin, M. M. Doeff, *Energy Environ. Sci.* 2014, 7, 3077.
[10] K. Kang, G. Ceder, *Phys. Rev. B* 2006, 74, 094105.
[11] W. Liu, P. Oh, X. Liu, M. J. Lee, W. Cho, S. Chae, Y. Kim, J. Cho, *Angew. Chemie—Int. Ed.* 2015, 54, 4440.
[12] W. Li, H. Y. Asl, Q. Xie, A. Manthiram, *J. Am. Chem. Soc.* 2019, 141, 5097.
[13] A. O. Kondrakov, A. Schmidt, J. Xu, H. Geßwein, R. Mönig, P. Hartmann, H. Sommer, T. Brezesinski, J. J. Janek, *J. Phys. Chem. C* 2017, 121, 3286.
[14] F. Zhang, S. Lou, S. Li, Z. Yu, Q. Liu, A. Dai, C. Cao, M. F. Toney, M. Ge, X. Xiao, W.-K. Lee, Y. Yao, J. Deng, T. Liu, Y. Tang, G. Yin, J. Lu, D. Su, J. Wang, *Nat. Commun.* 2020, 11, 3050.
[15] C. Tian, Y. Xu, C. Tian, Y. Xu, D. Nordlund, F. Lin, J. Liu, Z. Sun, Y. Liu, *Joule* 2018, 2, 464.
[16] Y. Mao, X. Wang, S. Xia, K. Zhang, C. Wei, S. Bak, Z. Shadike, X. Liu, Y. Yang, R. Xu, P. Pianetta, S. Ermon, E. Stavitski, K. Zhao, Z. Xu, F. Lin, X. Yang, E. Hu, *Adv. Funct. Mater.* 2019, 29, 1900247.
[17] Y. Yang, R. Xu, K. Zhang, S. Lee, L. Mu, P. Liu, C. K. Waters, S. Spence, Z. Xu, C. Wei, D. J. Kautz, Q. Yuan, Y. Dong, Y.-S. Yu, X. Xiao, H.-K. Lee, P. Pianetta, P. Cloetens, J.-S. Lee, K. Zhao, F. Lin, Y. Liu, *Adv. Energy Mater.* 2019, 9, 1900674.
[18] D. J. Miller, C. Proff, J. G. Wen, D. P. Abraham, J. Bareño, *Adv. Energy Mater.* 2013, 3, 1098.
[19] H. Liu, M. Wolf, K. Karki, Y. Yu, E. A. Stach, J. Cabana, K. W. Chapman, P. J. Chupas, *Nano Lett.* 2017, 17, 3452.
[20] Y. Su, S. Cui, Z. Zhuo, W. Yang, X. Wang, F. Pan, *ACS Appl. Mater. Interfaces* 2015, 7, 25105.
[21] Y. Shi, M. Zhang, D. Qian, Y. S. Meng, *Electrochim. Acta* 2016, 203, 154.
[22] D. Mohanty, K. Dahlberg, D. M. King, L. A. David, A. S. Sefat, D. L. Wood, C. Daniel, S. Dhar, V. Mahajan, M. Lee, F. Albano, *Sci. Rep.* 2016, 6, 26532.
[23] M. R. Laskar, D. H. K. Jackson, S. Xu, R. J. Hamers, D. Morgan, T. F. Kuech, *ACS Appl. Mater. Interfaces* 2017, 9, 11231.
[24] J. Ahn, E. K. Jang, S. Yoon, S. J. Lee, S. J. Sung, D. H. Kim, K. Y. Cho, *Appl. Surf. Sci.* 2019, 484, 701.
[25] H. Gao, J. Cai, G. L. Xu, L. Li, Y. Ren, X. Meng, K. Amine, Z. Chen, *Chem. Mater.* 2019, 31, 2723.
[26] W. Hu, C. Zhang, H. Jiang, M. Zheng, Q. H. Wu, Q. Dong, *Electrochim. Acta* 2017, 243, 105.
[27] J. Wang, Y. Yu, B. Li, T. Fu, D. Xie, J. Cai, J. Zhao, *Phys. Chem. Chem. Phys.* 2015, 17, 32033.
[28] Z. Chen, Y. Qin, K. Amine, Y. Sun, *J. Mater. Chem.* 2010, 7606.
[29] J. Duan, X. Tang, H. Dai, Y. Yang, W. Wu, X. Wei, Y. Huang, *Electrochem. Energy Rev.* 2020, 3, 1.
[30] K. S. Chen, R. Xu, N. S. Luu, E. B. Secor, K. Hamamoto, Q. Li, S. Kim, V. K. Sangwan, I. Balla, L. M. Guiney, J. W. T. Seo, X. Yu, W. Liu, J. Wu, C. Wolverton, V. P. Dravid, S. A. Barnett, J. Lu, K. Amine, M. C. Hersam, *Nano Lett.* 2017, 17, 2539.
[31] J.-M. Lim, N. S. Luu, K.-Y. Park, M. T. Z. Tan, S. Kim, J. R. Downing, K. He, V. P. Dravid, M. C. Hersam, *J. Vac. Sci. Technol. A* 2020, 38, 063210.
[32] E. B. Secor, P. L. Prabhumirashi, K. Puntambekar, M. L. Geier, M. C. Hersam, *J. Phys. Chem. Lett.* 2013, 4, 1347.

[33] A. C. M. De Moraes, J. Obrzut, V. K. Sangwan, J. R. Downing, L. E. Chaney, D. K. Patel, R. E. Elmquist, M. C. Hersam, *J. Mater. Chem. C* 2020, 8, 15086.

[34] P. Shafiei Sabet, D. U. Sauer, *J. Power Sources* 2019, 425, 121.

[35] K.-Y. Y. Park, J.-M. M. Lim, N. S. Luu, J. R. Downing, S. G. Wallace, L. E. Chaney, H. Yoo, W. J. Hyun, H.-U. U. Kim, M. C. Hersam, *Adv. Energy Mater.* 2020, 10, 2001216.

[36] J. Sánchez-González, A. Macías-García, M. F. Alexandre-Franco, V. Gómez-Serrano, *Carbon N. Y.* 2005, 43, 741.

[37] S.-C. Yin, Y.-H. Rho, I. Swainson, L. F. Nazar, *Chem. Mater.* 2006, 18, 1901.

[38] J.-M. Lim, T. Hwang, D. Kim, M. Park, K. Cho, *Sci. Rep.* 2017, 7, 2.

[39] B. Strzemiecka, A. Voelkel, J. Donate-Robles, J. M. Martin-Martinez, *Appl. Surf. Sci.* 2014, 316, 315.

[40] E. B. Secor, S. Lim, H. Zhang, C. D. Frisbie, L. F. Francis, M. C. Hersam, *Adv. Mater.* 2014, 26, 4533.

[41] E. B. Secor, T. Z. Gao, A. E. Islam, R. Rao, S. G. Wallace, J. Zhu, K. W. Putz, B. Maruyama, M. C. Hersam, *Chem. Mater.* 2017, 29, 2332.

[42] W. Li, A. Dolocan, P. Oh, H. Celio, S. Park, J. Cho, A. Manthiram, *Nat. Commun.* 2017, 8, 14589.

[43] X. Yang, J. Chen, Q. Zheng, W. Tu, L. Xing, Y. Liao, M. Xu, Q. Huang, G. Cao, W. Li, *J. Mater. Chem. A* 2018, 6, 16149.

[44] C. Xu, K. Märker, J. Lee, A. Mahadevegowda, P. J. Reeves, S. J. Day, M. F. Groh, S. P. Emge, C. Ducati, B. Layla Mehdi, C. C. Tang, C. P. Grey, *Nat. Mater.* 2021, 20, 84.

[45] F. Lin, D. Nordlund, T. Pan, I. M. Markus, T. C. Weng, H. L. Xin, M. M. Doeff, *J. Mater. Chem. A* 2014, 2, 19833.

[46] T. Hayashi, J. Okada, E. Toda, R. Kuzuo, N. Oshimura, N. Kuwata, J. Kawamura, *J. Electrochem. Soc.* 2014, 161, A1007.

[47] F. Lin, D. Nordlund, Y. Li, M. K. Quan, L. Cheng, T.-C. C. Weng, Y. Liu, H. L. Xin, M. M. Doeff, *Nat. Energy* 2016, 1, 15004.

[48] L. Jaber-Ansari, K. P. Puntambekar, S. Kim, M. Aykol, L. Luo, J. Wu, B. D. Myers, H. Iddir, J. T. Russell, S. J. Saldaña, R. Kumar, M. M. Thackeray, L. A. Curtiss, V. P. Dravid, C. Wolverton, M. C. Hersam, *Adv. Energy Mater.* 2015, 5, 1500646.

[49] M. D. Radin, J. Alvarado, Y. S. Meng, A. Van Der Ven, *Nano Lett.* 2017, 17, 7789.

[50] Y. Jiang, C. Qin, P. Yan, M. Sui, *J. Mater. Chem. A* 2019, 7, 20824.

[51] Z. Chen, J. R. Dahn, *Electrochim. Acta* 2004, 49, 1079.

[52] A. Yano, M. Shikano, A. Ueda, H. Sakaebe, Z. Ogumi, *J. Electrochem. Soc.* 2016, 164, A6116.

[53] W. M. Seong, K. Yoon, M. H. Lee, S. K. Jung, K. Kang, *Nano Lett.* 2019, 19, 29.

[54] H. Li, N. Zhang, J. Li, J. R. Dahn, *J. Electrochem. Soc.* 2018, 165, A2985.

[55] W. Li, J. N. Reimers, J. R. Dahn, *Solid State Ionics* 1993, 67, 123.

[56] L. Croguennec, C. Pouillerie, A. N. Mansour, C. Delmas, *J. Mater. Chem.* 2001, 11, 131.

[57] J. Choi, A. Manthiram, *J. Electrochem. Soc.* 2005, 152, A1714.

[58] W. E. Gent, Y. Li, S. Ahn, J. Lim, Y. Liu, A. M. Wise, C. B. Gopal, D. N. Mueller, R. Davis, J. N. Weker, J.-H. Park, S.-K. Doo, W. C. Chueh, *Adv. Mater.* 2016, 28, 6631.

[59] S. Li, Z. Jiang, J. Han, Z. Xu, C. Wang, H. Huang, C. Yu, S.-J. Lee, P. Pianetta, H. Ohldag, J. Qiu, J.-S. Lee, F. Lin, K. Zhao, Y. Liu, *Nat. Commun.* 2020, 11, 4433.

[60] Z. Jiang, J. Li, Y. Yang, L. Mu, C. Wei, X. Yu, P. Pianetta, K. Zhao, P. Cloetens, F. Lin, Y. Liu, *Nat. Commun.* 2020, 11, 2310.

[61] A. Mukhopadhyay, B. W. Sheldon, *Prog. Mater. Sci.* 2014, 63, 58.

[62] K. Min, E. Cho, *Phys. Chem. Chem. Phys.* 2018, 20, 9045.

[63] Y. Li, K. Yan, H.-W. W. Lee, Z. Lu, N. Liu, Y. Cui, *Nat. Energy* 2016, 1, 15029.

[64] T. H. Wan, M. Saccoccio, C. Chen, F. Ciucci, *Electrochim. Acta* 2015, 184, 483.

[65] B. H. Toby, R. B. Von Dreele, *J. Appl. Crystallogr.* 2013, 46, 544.

[66] Y. Mo, B. Hou, D. Li, X. Jia, B. Cao, L. Yin, Y. Chen, *RSC Adv.* 2016, 6, 88713.

[67] Y. Huang, F.-M. Jin, F.-J. Chen, L. Chen, *J. Power Sources* 2014, 256, 1.

[68] Y. Shi, M. Zhang, D. Qian, Y. S. Meng, *Electrochim. Acta* 2016, 203, 154.

[69] L. Li, Z. Chen, Q. Zhang, M. Xu, X. Zhou, H. Zhu, K. Zhang, *J. Mater. Chem. A* 2015, 3, 894.

[70] L. Liang, X. Sun, C. Wu, L. Hou, J. Sun, X. Zhang, C. Yuan, *ACS Appl. Mater. Interfaces* 2018, 10, 5498.

[71] D. Wang, X. Li, Z. Wang, H. Guo, Y. Xu, Y. Fan, *Electrochim. Acta* 2016, 196, 101.

[72] Z. Wu, S. Ji, T. Liu, Y. Duan, S. Xiao, Y. Lin, K. Xu, F. Pan, *Nano Lett.* 2016, 16, 6357.

[73] X. Jia, M. Yan, Z. Zhou, X. Chen, C. Yao, D. Li, D. Chen, Y. Chen, *Electrochim. Acta* 2017, 254, 50.

[74] T. Doi, R. Matsumoto, Z. Cao, M. Haruta, M. Hashinokuchi, M. Inaba, *Sustain. Energy Fuels* 2018, 2, 1197.

[75] Z. Wu, X. Han, J. Zheng, Y. Wei, R. Qiao, F. Shen, J. Dai, L. Hu, K. Xu, Y. Lin, W. Yang, F. Pan, *Nano Lett.* 2014, 14, 4700.

[76] R. Wang, X. Dai, Z. Qian, Y. Sun, S. Fan, K. Xiong, H. Zhang, F. Wu, *ACS Mater. Lett.* 2020, 2, 280.

[77] A. Zhamu et al., Graphene-enhanced cathode materials for lithium batteries. (2010), U.S. Pat. No. 8,691,441 B2.

[78] A. Zhamu et al., Nano graphene reinforced nanocomposite particles for lithium battery electrodes. (2008) U.S. Patent Application Publication No. 2010/0143798 A1.

[79] D. H. Adamson et al., Graphene/graphite polymer composite foam derived from emulsions stabilized by graphene/graphite kinetic trapping. (2015), PCT Patent Application Publication No. WO/2015/184155 A1.

[80] S. A. Miller, Coating a substance with graphene. (2010), U.S. Pat. No. 8,691,335 B2.

[81] Z-H Mao, B. Chahar, Carbon-coated silicon particle power as the anode material for lithium ion batteries and the method of making the same. (2003), EP Patent Publication No. EP 1702375 B1.

[82] R. Mo, et al., Facile synthesis of nanocrystalline $LiFePO_4$/graphene composite as cathode material for high power lithium ion batteries. (2014) Electrochimica Acta Volume 130, 594-599.

[83] N. Li, et al., The preparation and graphene surface coating $NaTi_2(PO_4)_3$ as cathode material for lithium ion batteries. (2017) Applied Surface Science Volume 399, 624-629.

[84] K. S. Chen, et al., Comprehensive Enhancement of Nanostructured Lithium-Ion Battery Cathode Materials via Conformal Graphene Dispersion. (2017) Nano Letters, 17, 4, 2539-2546.

[85] W. Xue, et al., Ultra-high-voltage Ni-rich layered cathodes in practical Li metal batteries enabled by a sulfonamide-based electrolyte. Nature Energy (2021).

[86] R. Wang, et al., In Situ Surface Protection for Enhancing Stability and Performance of LiNi$_{0.5}$Mn$_{0.3}$Co$_{0.2}$O$_2$ at 4.8 V: The Working Mechanisms. ACS Materials Lett. (2020), 2, 4, 280-290.

[87] W. Zhao, et al., High Voltage Operation of Ni-Rich NMC Cathodes Enabled by Stable Electrode/Electrolyte Interphases. Adv. Energy Mater. (2018), 8, 1800297.

[88] D. Mohanty, et al., Modification of Ni-Rich FCG NMC and NCA Cathodes by Atomic Layer Deposition: Preventing Surface Phase Transitions for High-Voltage Lithium-Ion Batteries. Scientific Reports 6, 26532 (2016).

[89] H. Gao, et al., Modifying the Surface of a High-Voltage Lithium-Ion Cathode. ACS Appl. Energy Mater. 2018, 1, 5, 2254-2260.

[90] J.-M. Lim, et al., Enhancing nanostructured nickel-rich lithium-ion battery cathodes via surface stabilization. Journal of Vacuum Science & Technology A 38, 063210 (2020).

[91] Y. Mo, et al., Enhanced high-rate capability and high voltage cycleability of Li$_2$TiO$_3$-coated LiNi$_{0.5}$Co$_{0.2}$Mn$_{0.3}$O$_2$ cathode materials. RSC Adv., 2016, 6, 88713-88718.

[92] Y. Huang, et al., Improved cycle stability and high-rate capability of Li$_3$VO$_4$-coated Li[Ni$_{0.5}$Co$_{0.2}$Mn$_{0.3}$]O$_2$ cathode material under different voltages. Journal of Power Sources 256 (2014) 1-7.

[93] L. Li, et al., A hydrolysis-hydrothermal route for the synthesis of ultrathin LiAlO$_2$-inlaid LiNi$_{0.5}$Co$_{0.2}$Mn$_{0.3}$O$_2$ as a high-performance cathode material for lithium ion batteries. Journal of Materials Chemistry A (2015), 3 (2), 894-904.

[94] L. Liang, et al., Nasicon-Type Surface Functional Modification in Core—Shell LiNi$_{0.5}$Mn$_{0.3}$Co$_{0.2}$O$_2$@NaTi$_2$(PO$_4$)$_3$ Cathode Enhances Its High-Voltage Cycling Stability and Rate Capacity toward Li-Ion Batteries. ACS Appl. Mater. Interfaces 2018, 10, 5498-5510.

[95] D. Wang, et al., Co-modification of LiNi$_{0.5}$Co$_{0.2}$Mn$_{0.3}$O$_2$ cathode materials with zirconium substitution and surface polypyrrole coating: towards superior high voltage. Electrochimica Acta (2016), 196, 101-109.

[96] X. Jia, et al., Nd-doped LiNi$_{0.5}$Co$_{0.2}$Mn$_{0.3}$O$_2$ as a cathode material for better rate capability in high voltage cycling of Li-ion batteries. Electrochimica Acta 254 (2017) 50-58.

[97] Z. Cao, et al., Dilution Effects of Highly Concentrated Carbonate Ester-Based Electrolyte Solutions for LiNi$_{0.8}$Co$_{0.1}$Mn$_{0.1}$O$_2$ Positive-Electrode. Sustainable Energy Fuels, 2018, 2, 1197-1205.

[98] Z. Wu, et al., Depolarized and Fully Active Cathode Based on Li(Ni$_{0.5}$Co$_{0.2}$Mn$_{0.3}$)O$_2$ Embedded in Carbon Nanotube Network for Advanced Batteries. Nano Lett. 2014, 14, 4700-4706.

What is claimed is:

1. A method for fabricating a composite material, comprising:
forming a mixture containing an active material, graphene, ethyl cellulose (EC) polymer and multiwalled carbon nanotubes (MWCNTs); and
thermally annealing the mixture at an annealing temperature in an oxidizing environment to decompose the majority of EC, thereby resulting in the composite material having each active material particle coated with a conformal graphene coating.

2. The method of claim 1, wherein said forming the mixture comprises:
dispersing the graphene, the EC polymer and the MWCNTs in a solvent to form a dispersion;
mixing the active material with the dispersion to form a slurry; and
drying the slurry.

3. The method of claim 2, wherein said forming the mixture further comprises exchanging said solvent with another solvent in the dispersion to promote better homogeneity and slurry stability during electrode casting.

4. The method of claim 3, wherein said solvent comprises ethanol, and said another solvent comprises N-Methyl 2-pyrrolidone (NMP).

5. The method of claim 4, wherein said exchanging the solvent exchange comprises adding said another solvent to the dispersion to form a solution, and subsequently removing said solvent by stirring and/or heating the solution.

6. The method of claim 2, wherein said forming the mixture further comprises, prior to said mixing the active material, annealing the active material at a temperature in a range of about 150-350° C., in flowing oxygen.

7. The method of claim 2, wherein said drying the slurry comprises drying the slurry at a first temperature in a range of about 80-200° C. in a convection oven, followed by a second drying step at a second temperature in a range of about 50-120° C. under dynamic vacuum.

8. The method of claim 1, wherein the annealing temperature is in a range of about 150-350° C.

9. The method of claim 1, wherein said graphene comprises solution-exfoliated graphene.

10. The method of claim 1, wherein the active material comprises lithium cobalt oxide, lithium nickel oxide, lithium iron phosphate, lithium manganese oxide, lithium nickel manganese cobalt oxide, lithium nickel cobalt aluminum oxide, lithium-rich oxides, or a combination thereof.

11. The method of claim 10, wherein the active material comprises nickel-rich lithium oxides.

12. The method of claim 11, wherein the active material comprises LiNi$_{0.8}$Co$_{0.15}$Al$_{0.05}$O$_2$ (NCA), LiNiO$_2$ (LNO), LiMn$_{1.5}$Ni$_{0.5}$O$_4$ (LMNO), LiNi$_x$Mn$_y$Co$_z$O$_2$ (NMC, where x+y+z=1), LiNi$_{0.8}$Co$_{0.2}$O$_2$ (LNCO), or Li$_w$Ni$_x$Mn$_y$Co$_z$O$_2$ (lithium-rich NMC, where w >1,x+y+z=1).

13. The method of claim 12, wherein the active material is doped with elements including Al, B, Zr, Nb, Fe, Cr, Cu, Mo, W, and/or V.

14. A composite material fabricated according to the method of claim 1.

15. A composite material, comprising: graphene; and an active material, wherein each active material particle is conformally coated with said graphene, wherein each active material particle is conformally coated with a combination of said graphene and an annealation product of ethyl cellulose that comprises amorphous carbon with sp$^2$-carbon content, such that Raman spectroscopy of said composite material has a peak at 2D-band, wherein the active material comprises lithium nickel oxide, lithium-rich oxides, or a combination thereof.

16. The composite material of claim 15, further comprising multiwalled carbon nanotubes (MWCNTs).

17. The composite material of claim 15, wherein said graphene comprises solution-exfoliated graphene.

18. The composite material of claim 15, wherein the active material further comprises lithium cobalt oxide, lithium iron phosphate, lithium manganese oxide, lithium nickel cobalt aluminum oxide, lithium nickel manganese cobalt oxide, or a combination thereof.

19. The composite material of claim 18, wherein the active material comprises nickel-rich lithium oxides.

20. The composite material of claim 19, wherein the active material comprises $LiNi_{0.8}Co_{0.15}Al_{0.05}O_2$ (NCA), $LiNiO_2$ (LNO), $LiMn_{1.5}Ni_{0.5}O_4$ (LMNO), $LiNi_xMn_yCo_zO_2$ (NMC, where x+y+z=1), $LiNi_{0.8}Co_{0.2}O_2$ (LNCO), or $Li_wNi_xMn_yCO_zO_2$ (lithium-rich NMC, where w >1, x+y+z=1).

21. The composite material of claim 20, wherein the active material is doped with elements including Al, B, Zr, Nb, Fe, Cr, Cu, Mo, W, and/or V.

22. An electrode for an electrochemical device, comprising: a composite material comprising graphene, and an active material, wherein each active material particle is conformally coated with said graphene, wherein each active material particle is conformally coated with a combination of said graphene and an annealation product of ethyl cellulose that comprises amorphous carbon with $sp^2$-carbon content, such that Raman spectroscopy of said composite material has a peak at 2D-band, wherein the active material comprises lithium nickel oxide, lithium-rich oxides, or a combination thereof.

23. The electrode of claim 22, wherein the composite material further comprises multiwalled carbon nanotubes (MWCNTs).

24. The electrode of claim 22, wherein said graphene comprises solution-exfoliated graphene.

25. The composite material of claim 22, wherein the active material further comprises lithium cobalt oxide, lithium iron phosphate, lithium manganese oxide, lithium nickel cobalt aluminum oxide, lithium nickel manganese cobalt oxide, or a combination thereof.

26. The electrode of claim 25, wherein the active material comprises nickel-rich lithium oxides.

27. The electrode of claim 26, wherein the active material comprises $LiNi_{0.8}Co_{0.15}Al_{0.05}O_2$ (NCA), $LiNiO_2$ (LNO), $LiMn_{1.5}Ni_{0.5}O_4$ (LMNO), $LiNi_xMn_yCo_zO_2$ (NMC, where x+y+z=1), $LiNi_{0.8}Co_{0.2}O_2$ (LNCO), or $Li_wNi_xMn_yCO_2O_z$ (lithium-rich NMC, where w >1, x+y+z=1).

28. The electrode of claim 27, wherein the active material is doped with elements including Al, B, Zr, Nb, Fe, Cr, Cu, Mo, W, and/or V.

29. The electrode of claim 22, wherein the conformal graphene coating reduces an accumulation of electrolyte decomposition products on the active material surface and reduces the severity of particle-level chemomechanical degradation.

30. The electrode of claim 22, wherein the conformal graphene coating promotes spatially uniform charge transfer reactions across the electrode surface during cycling and mitigating mechanical degradation, which delocalizes delithiation-induced strain and reduces the propensity for particle fracture.

31. The electrode of claim 22, wherein the conformal graphene coating is mechanically compliant towards unit cell volume changes at high states of charge and maintains electrical contact throughout cycling, whereby the electrode achieves substantially improved cycle life and coulombic efficiencies when cycled to high operating voltages.

32. The electrode of claim 22, wherein the electrode has a discharge capacity of about 203.1 mAh $g^{-1}$, during an activation cycle.

33. The electrode of claim 22, wherein the electrode retains about 70.9% of its initial volumetric capacity over 50 charge-discharge cycles at 0.5 C.

34. An electrochemical device, comprising the electrode of claim 22.

35. The electrochemical device of claim 34, being a battery.

* * * * *